United States Patent
Sakashita et al.

(10) Patent No.: US 11,122,208 B2
(45) Date of Patent: Sep. 14, 2021

(54) MONITORING SYSTEM

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/998,355

(22) Filed: Aug. 20, 2020

(65) Prior Publication Data

US 2020/0382710 A1 Dec. 3, 2020

Related U.S. Application Data

(62) Division of application No. 16/176,062, filed on Oct. 31, 2018, now Pat. No. 10,785,417.

(30) Foreign Application Priority Data

Nov. 6, 2017 (JP) .............................. JP2017-213694

(51) Int. Cl.
*H04N 5/232* (2006.01)
*G06K 9/00* (2006.01)
*H04N 7/18* (2006.01)

(52) U.S. Cl.
CPC ..... *H04N 5/23296* (2013.01); *G06K 9/00771* (2013.01); *H04N 5/23203* (2013.01); *H04N 7/181* (2013.01); *H04N 7/188* (2013.01)

(58) Field of Classification Search
CPC ........ H04N 7/181; H04N 7/188; H04N 5/247; H04N 7/18; H04N 5/232; H04N 5/23229;
(Continued)

(56) References Cited

U.S. PATENT DOCUMENTS 7,421,727 B2 9/2008 Oya et al.
8,228,383 B2 7/2012 Sugiura
(Continued)

FOREIGN PATENT DOCUMENTS

JP S62-296686 A 12/1987
JP 2001-243472 A 9/2001
(Continued)

OTHER PUBLICATIONS

An Office Action mailed by the Japanese Patent Office dated Jan. 22, 2019, which corresponds to Japanese Patent Application No. 2017-213694 and is related to U.S. Appl. No. 16/176,062.
(Continued)

*Primary Examiner* — Nathnael Aynalem
(74) *Attorney, Agent, or Firm* — Studebaker & Brackett PC

(57) ABSTRACT

A monitoring system detects an event happening to a detection target, and includes imaging devices, storage, and a controller. The imaging devices each capture an image of an imaging area including the detection target to generate captured image data indicating a captured image. The storage stores therein a detection range in the captured image. The controller detects a change to the captured image in the detection range based on the captured image data. The controller determines one of the imaging devices that has provided a captured image whose image exhibiting a portion of the detection target has a larger area among the captured images to be a main imaging device. Upon detecting a change to a captured image in the detection range captured by the main imaging device, the controller changes the detection range of the main imaging device so that the detection range encloses the detection target image.

10 Claims, 19 Drawing Sheets

(58) Field of Classification Search
CPC ........... H04N 5/23238; H04N 5/23296; H04N 5/23206; H04N 7/183; H04N 5/23251; H04N 5/2621; H04N 5/232939; G06K 9/00335; G06K 9/00771; G06T 7/20; G06T 7/254; G06Q 20/203
USPC .......................... 348/153, 155, 159, 169, 699
See application file for complete search history.

(56) References Cited

U.S. PATENT DOCUMENTS

| | | | |
|---|---|---|---|
| 10,467,498 B2 * | 11/2019 | Lee | ............... G06K 9/6202 |
| 2001/0019357 A1 | 9/2001 | Ito et al. | |
| 2004/0227817 A1 | 11/2004 | Oya et al. | |
| 2006/0203090 A1 | 9/2006 | Wang et al. | |
| 2008/0158361 A1 | 7/2008 | Itoh et al. | |
| 2009/0059002 A1 | 3/2009 | Kim | |
| 2009/0060271 A1 * | 3/2009 | Kim | ............... H04N 7/181 |
| | | | 382/103 |
| 2010/0097484 A1 * | 4/2010 | Yata | ............... H04N 5/23293 |
| | | | 348/222.1 |
| 2011/0090341 A1 | 4/2011 | Ikewada et al. | |
| 2013/0076913 A1 | 3/2013 | Xu et al. | |
| 2013/0329106 A1 | 12/2013 | Bigioi et al. | |
| 2014/0347501 A1 | 11/2014 | Ishida | |
| 2016/0336041 A1 | 11/2016 | Mukai et al. | |
| 2017/0220894 A1 | 8/2017 | Kuzuya et al. | |
| 2017/0323376 A1 * | 11/2017 | Glaser | ............... G06Q 20/203 |
| 2019/0141253 A1 | 5/2019 | Sakashita et al. | |

FOREIGN PATENT DOCUMENTS

| | | |
|---|---|---|
| JP | 2004-248090 A | 9/2004 |
| JP | 2019-87840 A | 6/2019 |

OTHER PUBLICATIONS

An Office Action mailed by the Japanese Patent Office dated Apr. 7, 2020, which corresponds to Japanese Patent Application No. 2019-124464 and is related to U.S. Appl. No. 16/176,062.

* cited by examiner

MONITORING SYSTEM

INCORPORATION BY REFERENCE

The present application is a Divisional of U.S. patent application Ser. No. 16/176,062 filed Oct. 31, 2018, which claims priority under 35 U.S.C. § 119 to Japanese Patent Application No. 2017-213694, filed on Nov. 6, 2017. The contents of this application are incorporated herein by reference in their entirety.

BACKGROUND

The present disclosure relates to a monitoring system.

An example of a camera setting apparatus includes a camera server and a terminal operation device. The camera server is connected with a camera. The camera server imports video taken using the camera and performs anomaly detection. The terminal operation device is connected with the camera server through a network and performs setting of various parameters to be used for the anomaly detection. Specifically, the terminal operation device displays a user interface screen. An operator of the terminal operation device sets the various parameters on the user interface screen. Specifically, the operator of the terminal operation device sets a rectangular detection range on the user interface screen using a pointing device. The camera server detects the occurrence of an anomaly based on a luminance change in the detection range.

SUMMARY

A monitoring system according to an aspect of the present disclosure detects an event happening to a detection target. The monitoring system includes a first imaging device, a second imaging device, storage, a controller, and a notification device. The first imaging device captures an image of a first imaging area including the detection target to generate first captured image data indicating a first captured image. The second imaging device captures an image of a second imaging area differing from the first imaging area to generate second captured image data indicating a second captured image. The storage stores therein data indicating a detection range. The controller detects a change to the first captured image or the second captured image in the detection range based on the first captured image data or the second captured image data. The notification device notifies a user of information. The detection range includes a detection target image exhibiting the detection target. In a situation in which the first captured image and the second captured image respectively include images exhibiting different portions of the detection target, the controller determines one of the first and second imaging devices that has provided a captured image whose image exhibiting a portion of the detection target has a larger area among the first and second captured images to be a main imaging device. In a situation in which the first captured image or the second captured image includes an image exhibiting a portion of the detection target, the controller directs the notification device to notify the user of a message prompting the user to move the detection target so that one imaging device of the first imaging device and the second imaging device that captures the image exhibiting the portion of the detection target captures an image of an entirety of the detection target, and determines an imaging device capturing the entirety of the detection target to be a main imaging device. Upon detecting a change to a captured image in the detection range captured by the main imaging device, the controller changes the detection range of the main imaging device so that the detection range encloses the detection target image.

A monitoring system according to another aspect of the present disclosure detects an event happening to a detection target. The monitoring system includes an imaging device, storage, and a controller. The imaging device captures an image of an imaging area including the detection target to generate captured image data indicating a captured image. The storage stores therein data indicating a detection range in the captured image. The controller detects a change to the captured image in the detection range based on the captured image data. The detection range includes a detection target image exhibiting the detection target. The controller determines whether or not any portion of an outline of the detection range falls outside of the captured image. In a situation in which a portion of the outline of the detection range falls outside of the captured image, the controller changes a position of the detection range so that an entirety of the outline of the detection range is located within the captured image.

A monitoring system according to yet another aspect of the present disclosure detects an event happening to a detection target. The monitoring system includes an imaging device, storage, a controller, and a notification device. The imaging device captures an image of an imaging area including the detection target to generate captured image data indicating a captured image. The storage stores therein data indicating a detection range in the captured image. The controller detects a change to the captured image in the detection range based on the captured image data. The notification device configured to notify a user of information. The detection range includes a detection target image exhibiting the detection target. Upon detecting a change to the captured image in the detection area, the controller determines whether or not the captured image includes the detection target image after a specific standby time elapses. Upon determining that the captured image does not include the detection target image, the controller causes the notification device to notify the user of a message indicating that the detection target has been removed.

DETAILED DESCRIPTION

Figure 1:
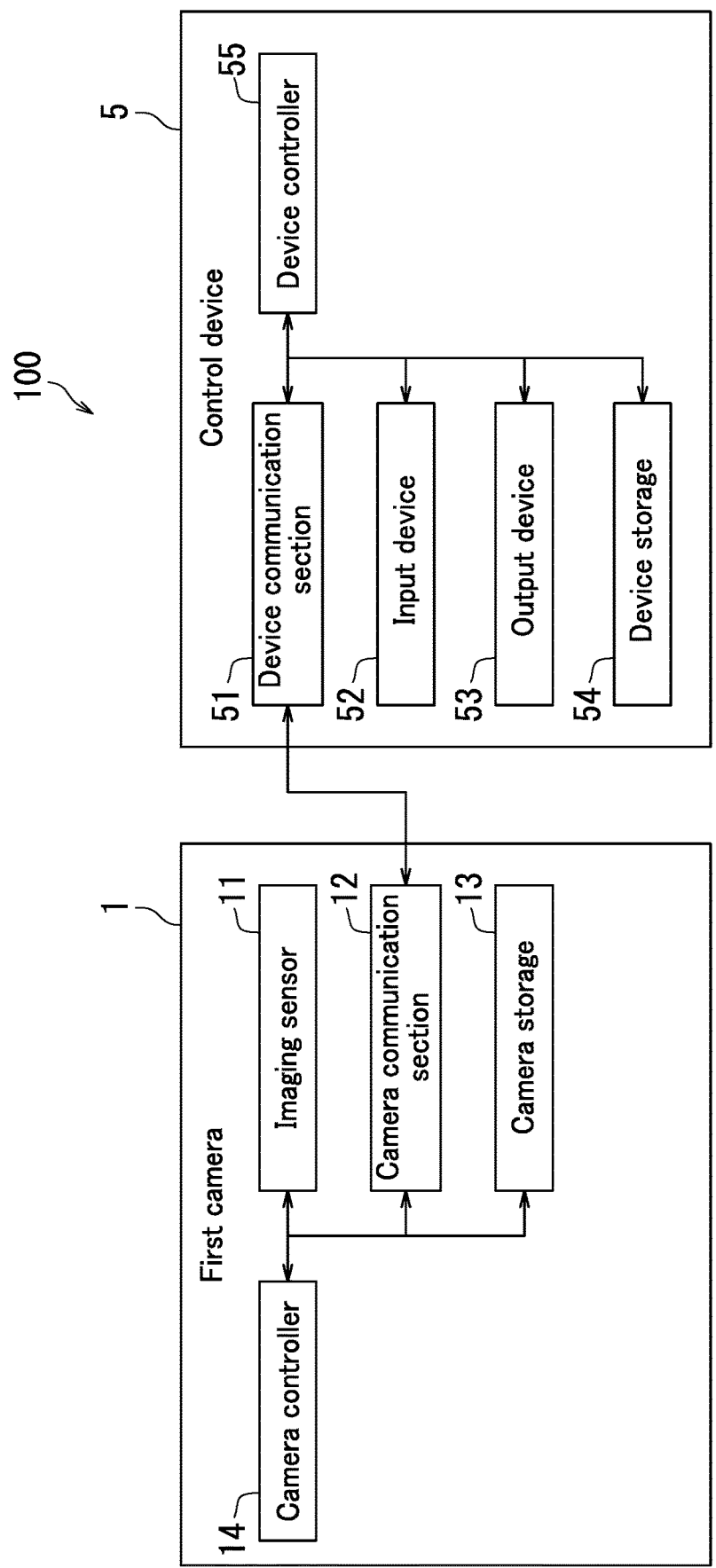
FIG. 1 is a diagram illustrating a configuration of a monitoring system according to a first embodiment of the present disclosure.

The following describes embodiments of a monitoring system according to the present disclosure with reference to the accompanying drawings. Elements that are the same or equivalent are indicated by the same reference signs in the drawings and description thereof is not repeated.

First Embodiment

The following first describes a monitoring system 100 according to a first embodiment of the present disclosure with reference to FIG. 1. FIG. 1 is a diagram illustrating a configuration of the monitoring system 100 according to the first embodiment. The monitoring system 100 according to the present embodiment detects an event happening to a detection target. The detection target is set (specified) by an administrator of the monitoring system 100. The detection target is for example an "object placed in a public area". The event happening to the detection target is for example "removal".

As illustrated in FIG. 1, the monitoring system 100 includes a first camera 1 and a control device 5. The first camera 1 is an example of what is referred to as a first imaging device.

The first camera 1 includes an image sensor 11, a camera communication section 12, camera storage 13, and a camera controller 14. The camera storage 13 is an example of what is referred to as first storage. The camera controller 14 is an example of what is referred to as a controller.

The image sensor 11 captures an image of an imaging area. The image sensor 11 generates data indicating the captured image and transmits the data to the camera controller 14. The data indicating the captured image is referred to below as "captured image data". The image sensor 11 is for example a charge-coupled device (CCD) image sensor or a complementary metal-oxide-semiconductor (CMOS) image sensor.

The camera communication section 12 is capable of communication with an electronic device equipped with a communication device using the same communication method (protocol). The camera communication section 12 communicates with the control device 5 through a network such as a local area network (LAN). The camera communication section 12 is for example a communication module (communication device) such as a LAN board. According to the present embodiment, the camera communication section 12 transmits the captured image data to the control device 5.

The camera storage 13 stores therein various data such as the captured image data. The camera storage 13 includes semiconductor memory. The semiconductor memory is for example random access memory (RAM) and read only memory (ROM).

The camera controller 14 controls operation of the elements of the first camera 1 by executing a camera control program stored in the camera storage 13. The camera controller 14 for example includes a processor such as a micro processing unit (MPU).

The camera controller 14 detects a change to the captured image in a detection range based on the captured image data. According to the present embodiment, the detection range is preset by the administrator. Data indicating the detection range is stored in the camera storage 13.

The camera controller 14 for example detects a change to the captured image by a background subtraction method. Alternatively, the camera controller 14 detects a change to the captured image by an inter-frame difference method.

Upon detecting a change to the captured image in the detection range, the camera controller 14 toggles a flag from off to on. The flag indicates that a change has occurred in the captured image in the detection range. Data indicating the flag is stored in the camera storage 13.

Upon detecting a change to the captured image in the detection range, the camera controller 14 stores the captured image data in the camera storage 13. Also, upon detecting a change to the captured image in the detection range, the camera controller 14 transmits data indicating the detection of the change to the captured image in the detection range to the control device 5 through the camera communication section 12. The data indicating the detection of the change to the captured image in the detection range is referred to below as "change detection data".

The control device 5 includes a device communication section 51, an input device 52, an output device 53, device storage 54, and a device controller 55. The device communication section 51 and the output device 53 are an example of what is referred to as a notification device. The device storage 54 is an example of what is referred to as second storage. The device controller 55 is an example of what is referred to as a controller. The control device 5 is for example a server.

The device communication section 51 is capable of communication with an electronic device equipped with a communication device using the same communication method (protocol). The device communication section 51 communicates with the camera communication section 12 through the network such as a LAN. The device communication section 51 is for example a communication module (communication device) such as a LAN board. According to the present embodiment, the device communication section 51 receives the captured image data from the camera communication section 12. The device communication section 51 also receives the change detection data from the camera communication section 12 upon the camera controller 14 detecting a change to the captured image.

The input device 52 receives input of an instruction from a user to the control device 5. According to the present embodiment, the input device 52 includes a keyboard and a mouse. The input device 52 may include a touch sensor.

The output device 53 outputs the captured image based on the captured image data received by the device communication section 51. According to the present embodiment, the output device 53 includes a display such as a liquid-crystal display.

The device storage 54 stores therein various data such as the captured image data. The device storage 54 includes a storage device and semiconductor memory. The storage device for example includes either or both of a hard disk drive (HDD) and a solid state drive (SSD). The semiconductor memory is for example RAM and ROM.

The device controller 55 controls operation of the elements of the control device 5 by executing a device control program stored in the device storage 54. The device controller 55 for example includes a processor such as a central processing unit (CPU).

Upon the input device 52 receiving an instruction to output the captured image, the device controller 55 directs the output device 53 to output the captured image based on the captured image data received by the device communication section 51. Alternatively, the device controller 55 directs the output device 53 to output the captured image based on the captured image data stored in the device storage 54.

The device controller 55 also receives setting of the detection range and the detection target by the administrator. According to the present embodiment, the device controller 55 directs the output device 53 to display a setting screen for setting the detection range and the detection target.

Figure 2:
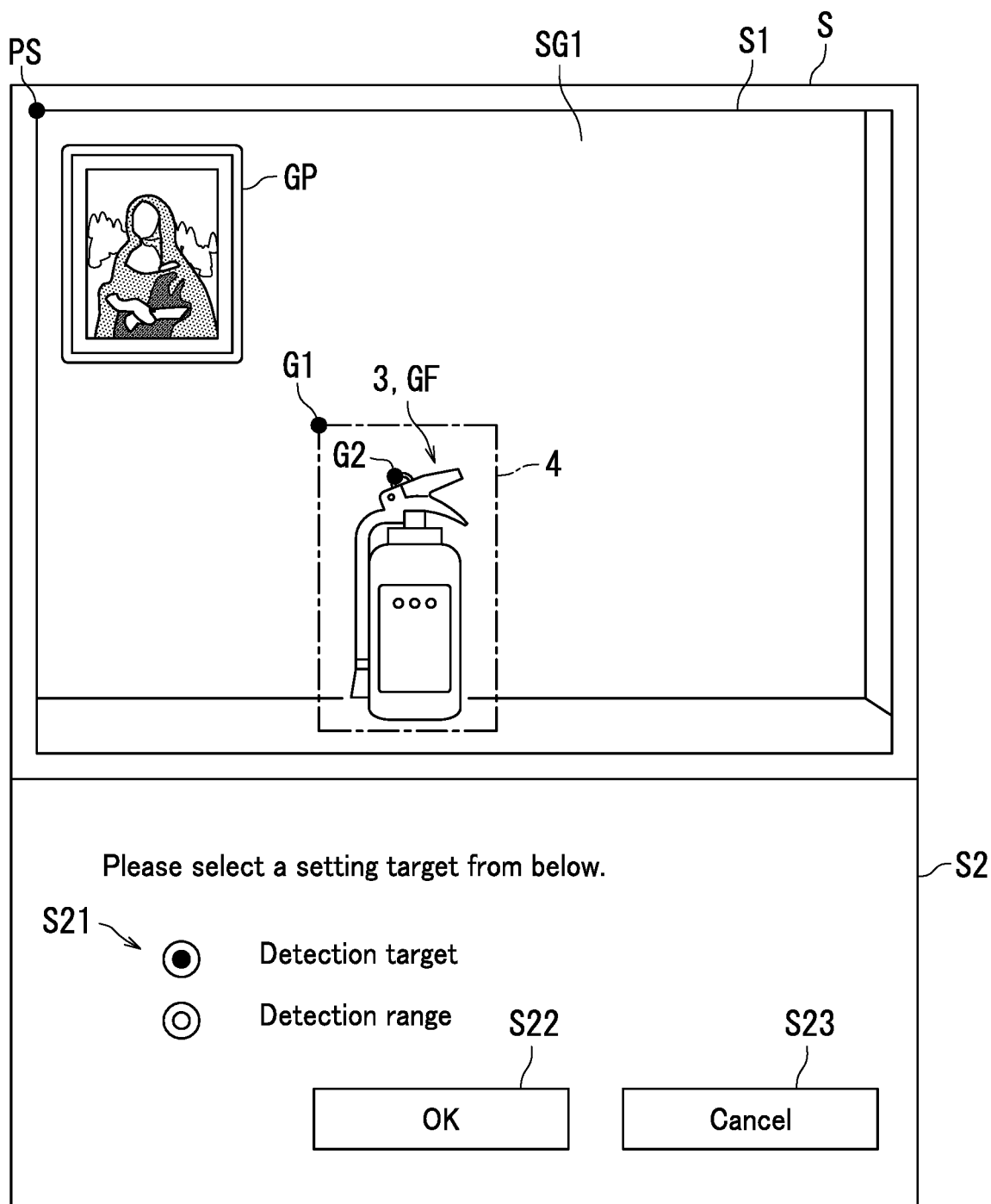
FIG. 2 is a diagram illustrating an example of a setting screen according to the first embodiment of the present disclosure.

The following describes a setting screen S according to the present embodiment with reference to FIGS. 1 and 2. FIG. 2 is a diagram illustrating an example of the setting screen S according to the first embodiment. Note that the following describes the embodiment on the assumption that a longitudinal direction of a captured image SG1 is an X axis direction, and a lateral direction of the captured image SG1 is a Y axis direction. The following also describes the embodiment on the assumption that one side (a right side in FIG. 2) in the longitudinal direction (the X axis direction) of the captured image SG1 is an X1 side, and an opposite side (a left side in FIG. 2) thereto is an X2 side. The following also describes the embodiment on the assumption that one side (an upper side in FIG. 2) in the lateral direction (the Y axis direction) of the captured image SG1 is a Y1 side, and an opposite side (a lower side in FIG. 2) thereto is a Y2 side.

As illustrated in FIG. 2, the setting screen S includes a display section 51 and a setting receiving section S2. The device controller 55 displays the captured image SG1 on a display surface of the display section 51 based on the captured image data received by the device communication section 51. In the example illustrated in FIG. 2, the captured image SG1 includes a fire extinguisher image GF exhibiting a fire extinguisher and a painting image GP exhibiting a painting. In other words, the first camera 1 (the image sensor 11) captures an image of an imaging area in which the fire extinguisher and the painting are placed.

The setting receiving section S2 receives setting (registration) of a detection range 4 and a detection target. Specifically, the setting receiving section S2 includes a setting target selection section S21, an OK button S22, and a cancel button S23. The administrator can select either the "detection target" or the "detection range" as a setting target by operating the setting target selection section S21 using the input device 52. Specifically, the setting target selection section S21 includes radio buttons. The administrator can select either the "detection target" or the "detection range" as the setting target by switching each of the radio buttons between being selected and being not selected using the input device 52.

The administrator can specify the detection target on the captured image SG1 displayed in the display section S1 by selecting the "detection target" as the setting target. Specifically, the administrator can specify the detection target from among images exhibiting objects included in the captured image SG1 (for example, the fire extinguisher image GF and the painting image GP) by selecting (for example, clicking on) an image 3 exhibiting the detection target using the input device 52. The image 3 exhibiting the detection target is referred to below as a "detection target image 3".

When the detection range 4 is selected as the setting target, the administrator can specify the detection range 4 by selecting an appropriate area (for example, dragging so as to draw a rectangular shape) including the detection target image 3 on the captured image SG1 displayed in the display section S1 using the input device 52. Once the detection range 4 has been specified, an image (for example, dashed and dotted lines) defining the detection range 4 is displayed on the captured image SG1. The image defining the detection range 4 indicates an outline of the detection range 4.

After specifying the detection target (the detection target image 3) and the detection range 4, the administrator can set (register) the detection target (the detection target image 3) and the detection range 4 by pressing the OK button S22 using the input device 52. Upon detecting pressing of the OK button S22, the device controller 55 acquires data indicating the detection target image 3 and data indicating the detection range 4. According to the present embodiment, the administrator sets the fire extinguisher (the fire extinguisher image GF) as the detection target (the detection target image 3) and sets an area enclosing the detection target image 3 (the fire extinguisher image GF) as the detection range 4. Note that when detecting pressing of the cancel button S23, the device controller 55 stops displaying the setting screen S without acquiring the data indicating the detection target image 3 or the data indicating the detection range 4. The data indicating the detection target image 3 is referred to below as "detection target image data", and the data indicating the detection range 4 is referred to below as "detection range data".

Upon acquiring the detection target image data and the detection range data, the device controller 55 stores the detection target image data as recognition image data in the device storage 54. The device controller 55 associates the recognition image data with the detection range data in accordance with a specific condition to store the data in the device storage 54. Specifically, in accordance with the specific condition, the device controller 55 determines one of pixels making up the outline of the detection range 4 as a first identification pixel G1 and determines one of pixels making up the detection target image 3 as a second identification pixel G2. The first identification pixel G1 is for example a pixel displayed in a position closest to an origin PS (for example, an upper left corner) of the display surface among the pixels making up the outline of the detection range 4. According to the present embodiment, the device controller 55 determines a pixel displayed on the farthest Y1 side as the first identification pixel G1 in a situation in which there is a plurality of pixels displayed in a position closest to the origin PS of the display surface. Likewise, the second identification pixel G2 is a pixel displayed in a position closest to the origin PS of the display surface among the pixels making up the detection target image 3. According to the present embodiment, the device controller 55 determines a pixel displayed on the farthest Y1 side as the second identification pixel G2 in a situation in which there is a plurality of pixels displayed in a position closest to the origin PS of the display surface.

Upon determining the first identification pixel G1 and the second identification pixel G2, the device controller 55 generates relative position data indicating a relationship between relative positions of the first identification pixel G1 and the second identification pixel G2. The relative position data is generated based on a position (coordinates) in which the first identification pixel G1 is displayed and a position (coordinates) in which the second identification pixel G2 is displayed. The device controller 55 stores the generated relative position data in the device storage 54.

The device controller 55 also transmits the detection range data to the camera communication section 12 through the device communication section 51 once the detection range 4 is set. Upon the camera communication section 12 receiving the detection range data, the camera controller 14 stores the detection range data in the camera storage 13. The image sensor 11 detects a change to the captured image in the detection range 4 indicated by the detection range data.

Figure 3:
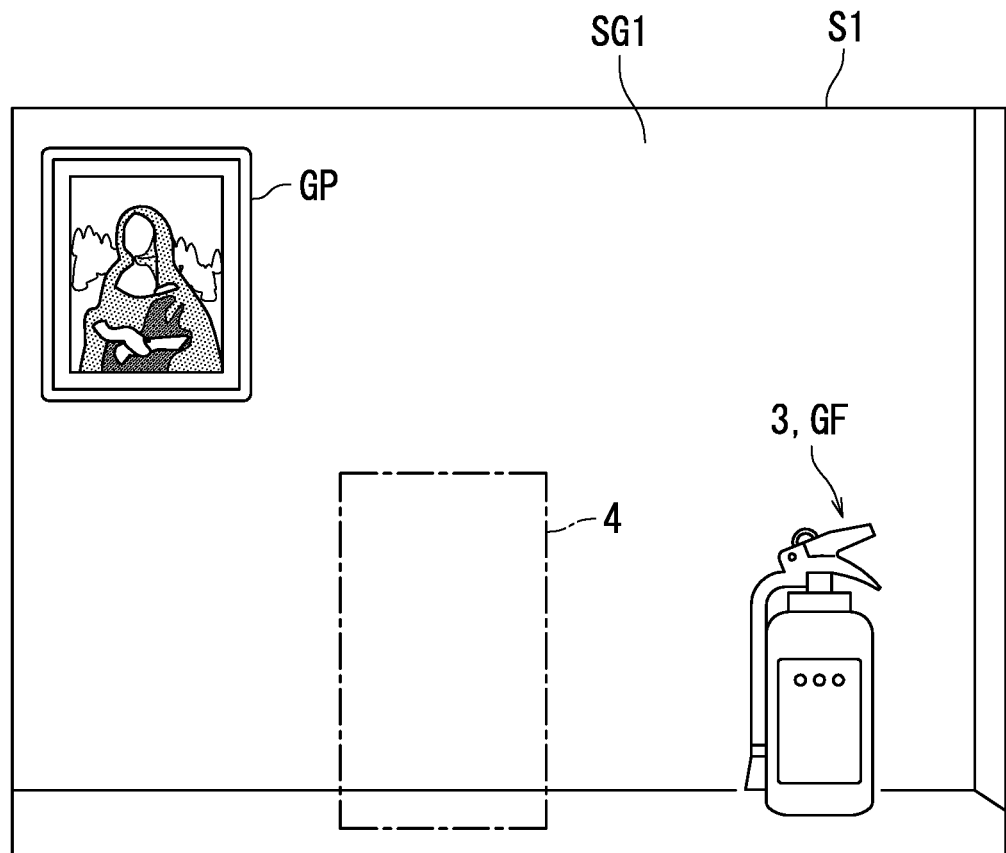
FIG. 3 is a diagram illustrating an example of a captured image after a detection target image shown in FIG. 2 has been moved.
Figure 4:
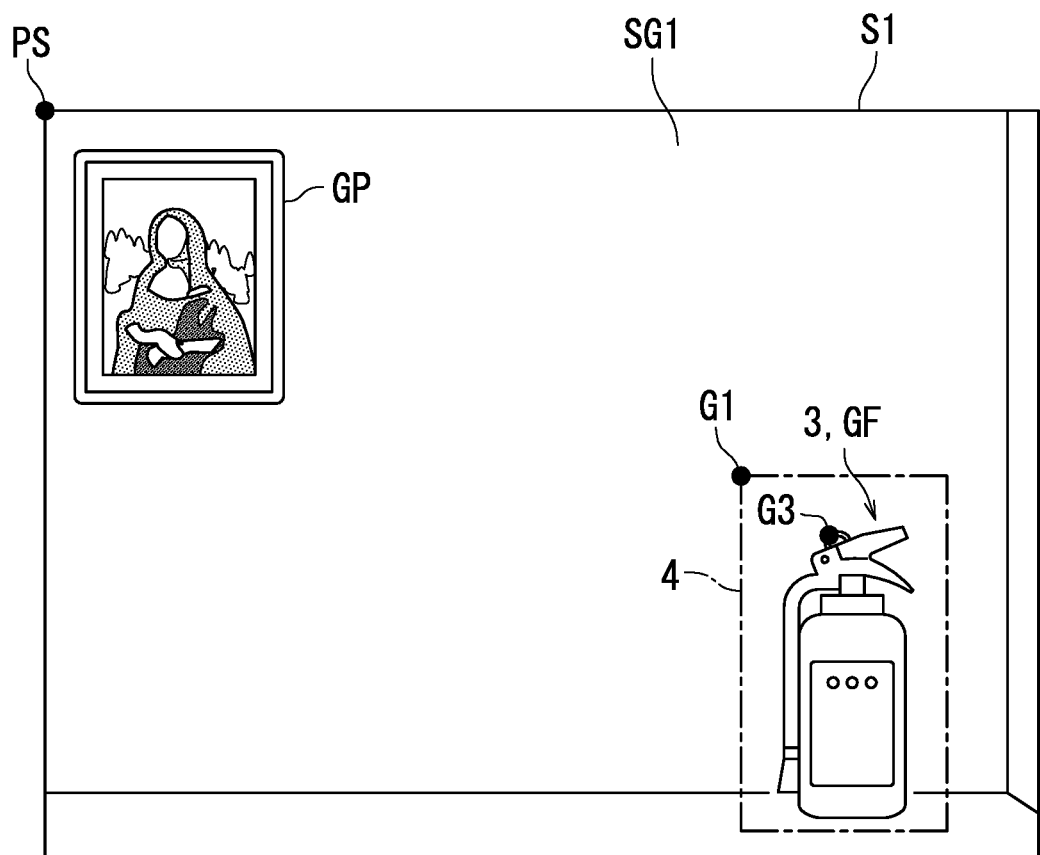
FIG. 4 is a diagram illustrating an example of the captured image after a detection range shown in FIG. 3 has been changed.

Referring to FIGS. 1 to 5, the following describes a process to be performed by the monitoring system 100 in a situation in which the camera controller 14 has detected a change to the captured image in the detection range 4. FIG. 3 is a diagram illustrating an example of the captured image SG1 after the detection target image 3 shown in FIG. 2 has been moved. FIG. 4 is a diagram illustrating an example of the captured image SG1 after the detection range 4 shown in FIG. 3 is changed.

Once the detection target (the fire extinguisher image GF) has been moved as illustrated in FIGS. 2 and 3, and the camera controller 14 described with reference to FIG. 1 has detected the change to the captured image in the detection range 4, the change detection data is transmitted to the device communication section 51.

Upon the device communication section 51 receiving the change detection data, the device controller 55 stores the captured image data received by the device communication section 51 in the device storage 54 and performs a detection range changing process. That is, the device controller 55 changes the position of the detection range 4 depending on the movement of the detection target (the fire extinguisher image GF) as illustrated in FIGS. 3 and 4. Specifically, the device controller 55 changes the position of the detection range 4 so that the detection range 4 encloses the detection target image 3.

More specifically, as illustrated in FIG. 4, the device controller 55 changes the position of the detection range 4 so that a relationship between relative positions of one (a third identification pixel G3) of pixels making up the moved detection target image 3 and one (the first identification pixel G1) of pixels making up the outline of the detection range 4 matches the relationship between the relative positions indicated by the relative position data stored in the device storage 54. For example, the device controller 55 acquires, as the third identification pixel G3, a pixel displayed in a position closest to the origin PS of the display surface from the pixels making up the moved detection target image 3 and acquires the position (coordinates) in which the third identification pixel G3 is displayed. Note that the device controller 55 acquires a pixel displayed on the farthest Y1 side as the third identification pixel G3 in a situation in which there is a plurality of pixels displayed in a position closest to the origin PS of the display surface.

The device controller 55 determines the position (coordinates) in which the first identification pixel G1 is to be displayed based on data (coordinate data) indicating the position in which the third identification pixel G3 is displayed and the relative position data stored in the device storage 54. In other words, the device controller 55 changes the position of the detection range 4 so that the relationship between the relative positions of the first identification pixel G1 and the third identification pixel G3 matches the relationship between the relative positions indicated by the relative position data.

Figure 5:
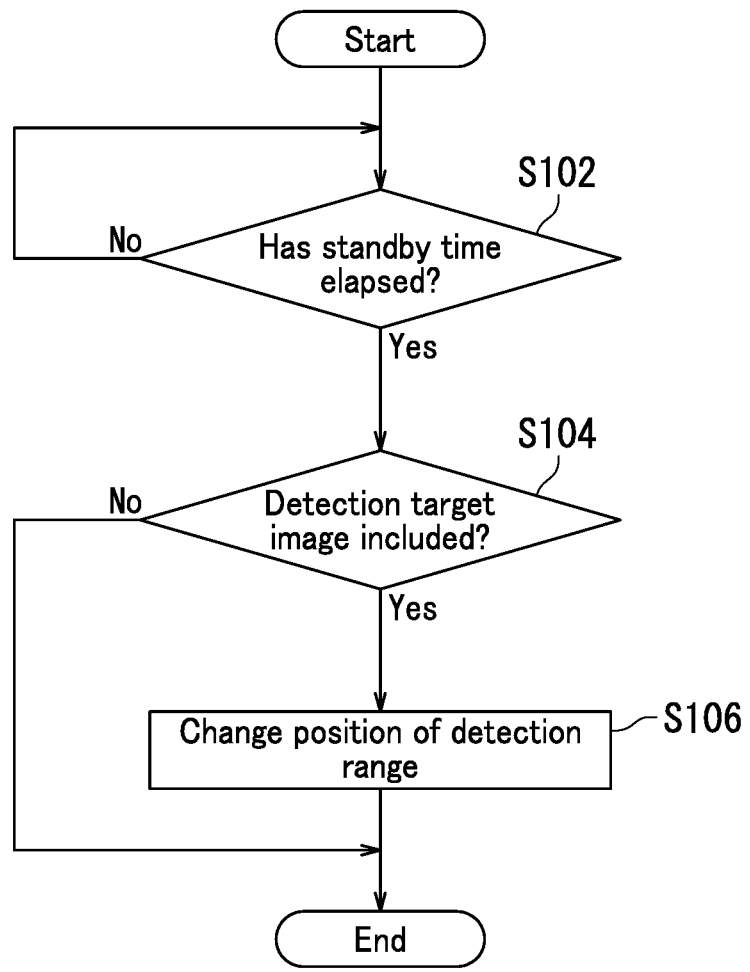
FIG. 5 is a flowchart illustrating a detection range changing process according to the first embodiment of the present disclosure.

The following further describes the detection range changing process according to the first embodiment with reference to FIG. 5. FIG. 5 is a flowchart illustrating the detection range changing process according to the first embodiment. The detection range changing process starts once the device communication section 51 has received the change detection data.

As illustrated in FIG. 5, upon the device communication section 51 receiving the change detection data, the device controller 55 remains on standby until a standby time elapses (No in Step S102). The standby time is preset by the administrator and stored in the device storage 54. The administrator for example sets, as the standby time, a period of time expected to be required for a person who is removing the detection target to move out of the imaging area. The standby time is for example one minute.

Upon determining that the standby time has elapsed (Yes in Step S102), the device controller 55 searches the captured image SG1 for an image that matches a recognition image indicated by the recognition image data and determines whether or not the detection target image 3 is included in the captured image SG1 based on the captured image data received by the device communication section 51 and the recognition image data stored in the device storage 54 (Step S104). Specifically, the device controller 55 searches for the detection target image 3 by a pattern matching process. Specifically, the device controller 55 compares the captured image data with the recognition image data stored in the device storage 54 and determines whether or not the detection target image 3 is included in the captured image SG1 depending on whether or not the captured image SG1 includes an image that matches the recognition image at a percentage equal to or greater than a first threshold. The first threshold is for example preset by the administrator.

Upon determining that the detection target image 3 is not included in the captured image SG1 (No in Step S104), the device controller 55 ends the detection range changing process and directs the device communication section 51 to notify that the detection target has been removed. Specifically, the device controller 55 sends an e-mail indicating that the detection target has been removed to the administrator through the device communication section 51. Alternatively, the device controller 55 directs the output device 53 to display a message indicating that the detection target has been removed.

On the other hand, upon determining that the detection target image 3 is included in the captured image SG1 (Yes in Step S104), in other words, upon determining that the position of the detection target has been changed, the device controller 55 changes the position of the detection range 4 (Step S106). After changing the position of the detection range 4, the device controller 55 deletes the captured image data from the device storage 54. The device controller 55 also transmits the detection range data indicating the changed detection range 4 and a request to toggle the flag to off to the camera communication section 12 through the device communication section 51. Upon the camera communication section 12 receiving the detection range data indicating the changed detection range 4, the camera controller 14 updates the detection range data stored in the camera storage 13 to the detection range data indicating the changed detection range 4. Upon the camera communication section 12 receiving the request to toggle the flag to off, the camera controller 14 toggles the flag to off. After toggling the flag to off, the camera controller 14 deletes the captured image data from the camera storage 13. Thus, the detection range changing process is completed.

The camera communication section 12 detects a change to the captured image SG1 based on the detection range data indicating the changed detection range 4 stored in the camera storage 13.

Through the above, the first embodiment has been described. According to the present embodiment, in a situation in which the detection target is moved, the device controller 55 changes the position of the detection range 4 so that the detection range 4 encloses the detection target image 3. Therefore, the administrator does not need to reset the detection range 4. This offloads the work associated with setting of the detection range 4 from the administrator.

Note that although a configuration of the present embodiment has been described as an example in which the output device 53 is a display, the output device 53 may for example be a printer that outputs an image onto a sheet such as paper.

Furthermore, although a configuration of the present embodiment has been described as an example in which the detection range 4 has a rectangular shape, no particular limitations are placed on the shape of the detection range 4 so long as the shape encloses the detection target image 3. The detection range 4 may for example have a shape that fits an outline of the detection target image 3.

In a situation in which the orientation of the detection target is different before and after the detection target has been moved, for example, the percentage of match between the moved detection target image 3 and the recognition image may be lower than a second threshold. The second threshold is set by the administrator. The second threshold is higher than the first threshold. In a situation in which the percentage of match is lower than the second threshold and higher than the first threshold, the device controller 55 may direct the output device 53 to output a message that prompts rearrangement of the detection target by changing the orientation of the detection target relative to the first camera 1, so that the administrator is notified of the information. The second threshold is an example of what is referred to as a threshold.

Although the detection target image 3 (an image exhibiting the detection target viewed from one direction) included in the captured image SG is stored as the recognition image in the device storage 54 according to the present embodiment, the recognition image may be a plurality of images exhibiting the detection target viewed from multiple directions. In such an implementation, the device controller 55 calculates the percentage of match using the plurality of images stored in the device storage 54, selects a recognition image having the highest percentage of match from among the plurality of recognition images, and searches for the detection target image 3.

Furthermore, although a configuration of the present embodiment has been described as an example in which the recognition image data indicates the detection target image 3, the recognition image data may for example indicate a shape (outline) of the detection target.

Figure 6:
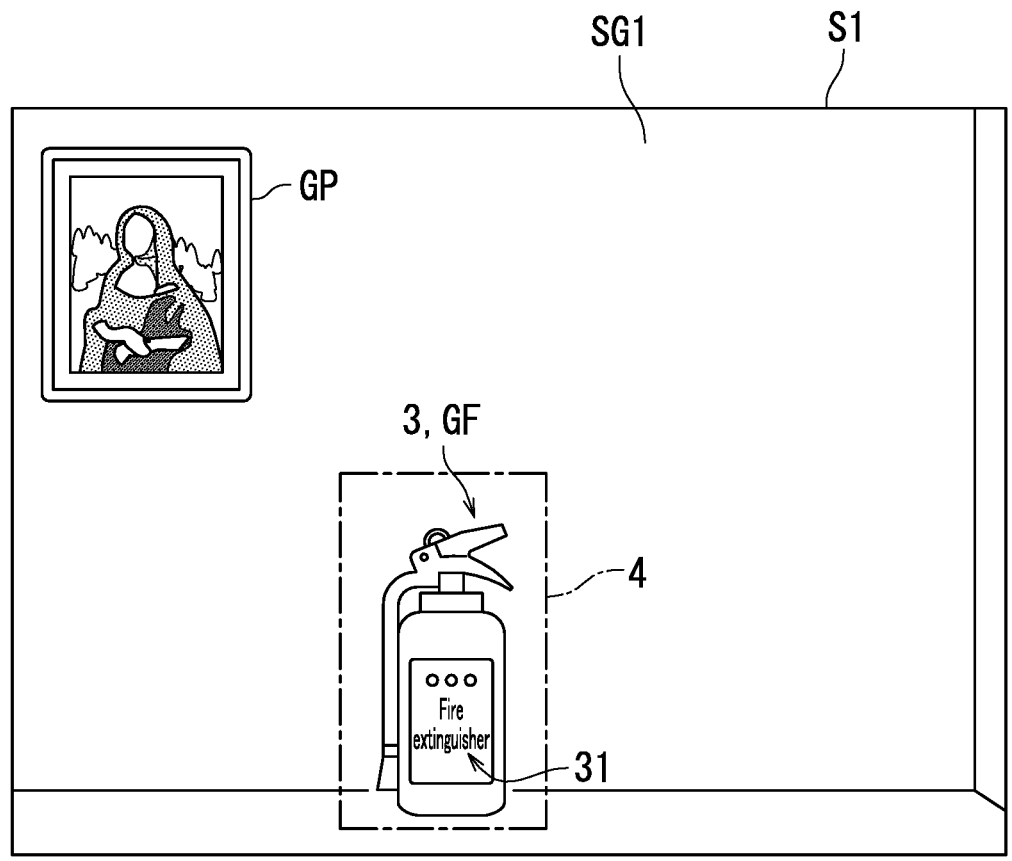
FIG. 6 is a diagram illustrating another example of the captured image according to the first embodiment of the present disclosure.

Alternatively, in a situation in which the captured image SG1 includes an identification image 31 that identifies the detection target, the recognition image data may indicate the identification image 31. The device controller 55 for example acquires the identification image 31 using an optical character recognition (OCR) function. Specifically, the device controller 55 analyzes a text image included in the captured image SG1 using the OCR function to acquire the identification image 31. FIG. 6 is a diagram illustrating another example of the captured image SG1 according to the first embodiment. In the example illustrated in FIG. 6, the detection target is a fire extinguisher, and the identification image 31 exhibits the letters "Fire extinguisher".

Figure 7:
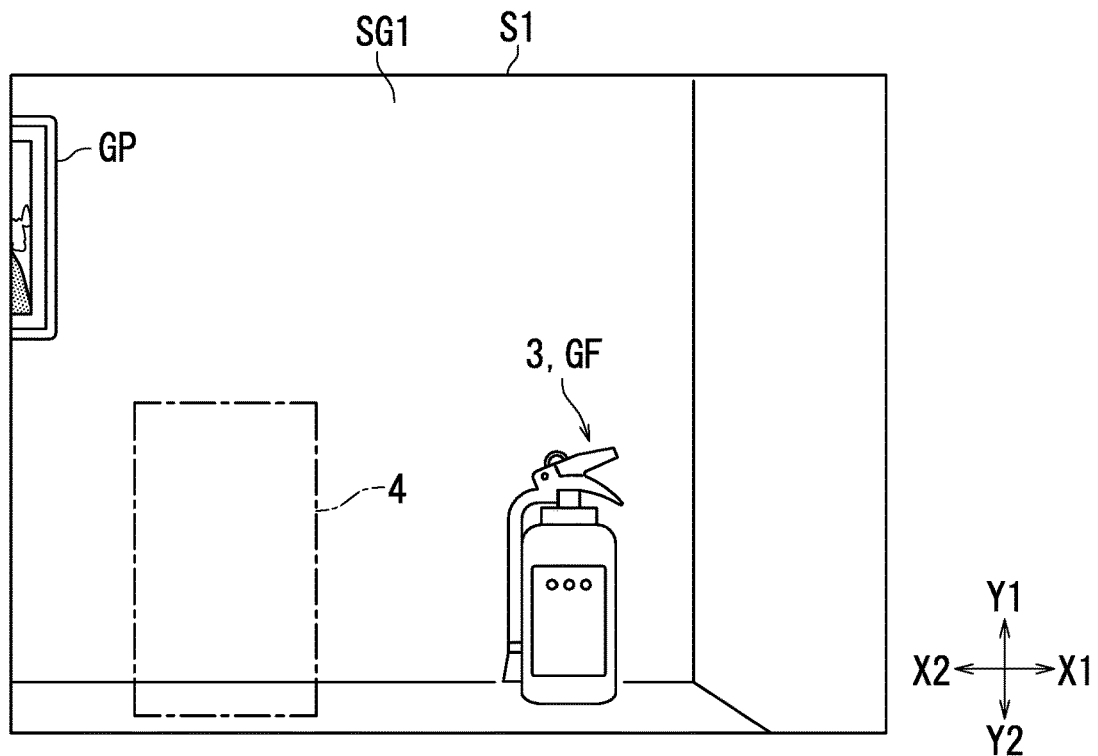
FIG. 7 is a diagram illustrating a first additional example of the captured image after the detection target image shown in FIG. 2 has been moved.
Figure 8:
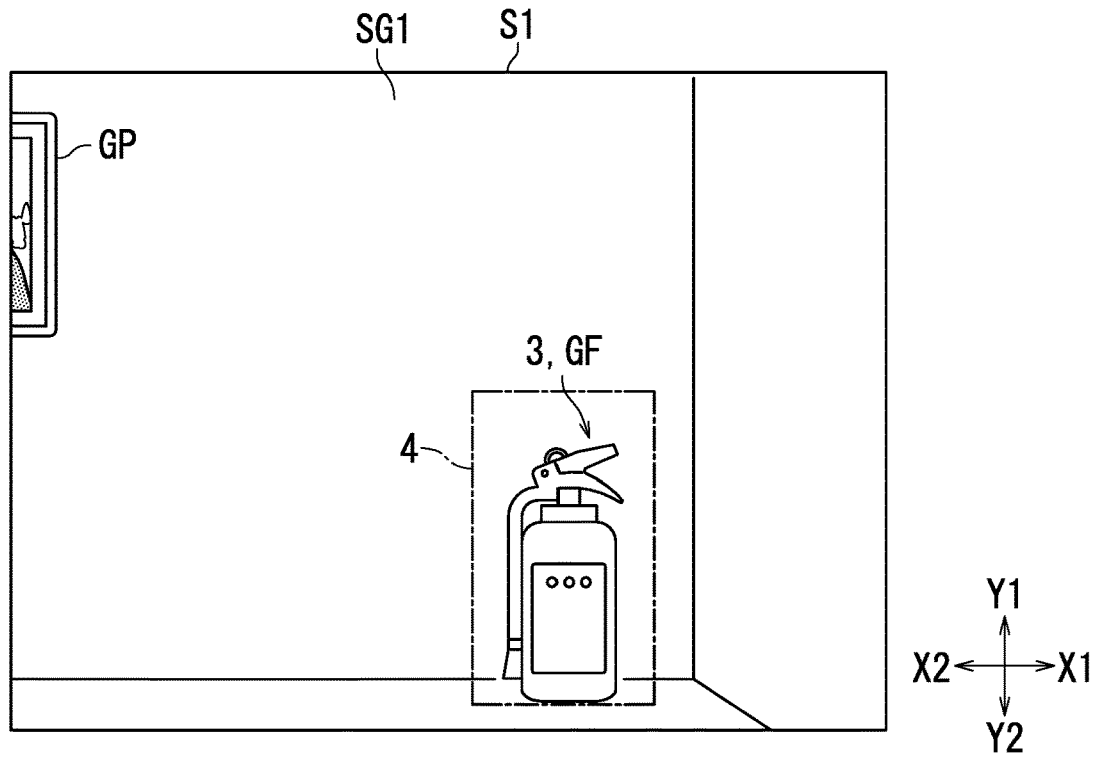
FIG. 8 is a diagram illustrating an example of the captured image after the detection range shown in FIG. 7 has been changed.

Furthermore, although a configuration of the present embodiment has been described as an example in which the image sensor 11 captures an image of a fixed imaging area, the imaging area for the image sensor 11 may be varied such that the camera controller 14 follows the detection target when motion of the detection target is detected based on a change in pixels included in the detection range 4. For example, when the detection target image 3 is moved in an X1 direction as illustrated in FIGS. 2 and 7, the imaging area shifts in the X1 direction. FIG. 7 is a diagram illustrating a first additional example of the captured image SG1 after the detection target image 3 shown in FIG. 2 has been moved. FIG. 8 is a diagram illustrating an example of the captured image SG1 after the detection range 4 shown in FIG. 7 has been changed. As illustrated in FIG. 8, the device controller 55 changes the position of the detection range 4 so that the detection range 4 encloses the moved detection target image 3 as described with reference to FIGS. 2 to 5.

Although the standby time is set as a period of time expected to be required for a person who is removing the detection target to move out of the imaging area according to the present embodiment, the standby time may be altered. For example, in a situation in which there is a plan to use the detection target, the standby time may be temporarily altered by the device controller 55 to a period of time during which the detection target is to be used. Specifically, in an implementation in which the detection target is a fire extinguisher, the standby time may be altered to a period of time during which a fire drill is to be held. Thus, a false detection of removal of the detection target is prevented.

Although the device controller 55 detects an event happening to the detection target according to the present embodiment, the camera controller 14 may alternatively detect an event happening to the detection target.

Second Embodiment

The following describes a monitoring system 100 according to a second embodiment of the present disclosure with reference to FIGS. 1, 2, and 9 to 11. The second embodiment is different from the first embodiment in that the device controller 55 changes the detection range 4 when the detection range 4 falls outside of the captured image SG1. The following describes differences between the first and second embodiments, and redundant description shared with the first embodiment is omitted to avoid repetition.

Figure 9:
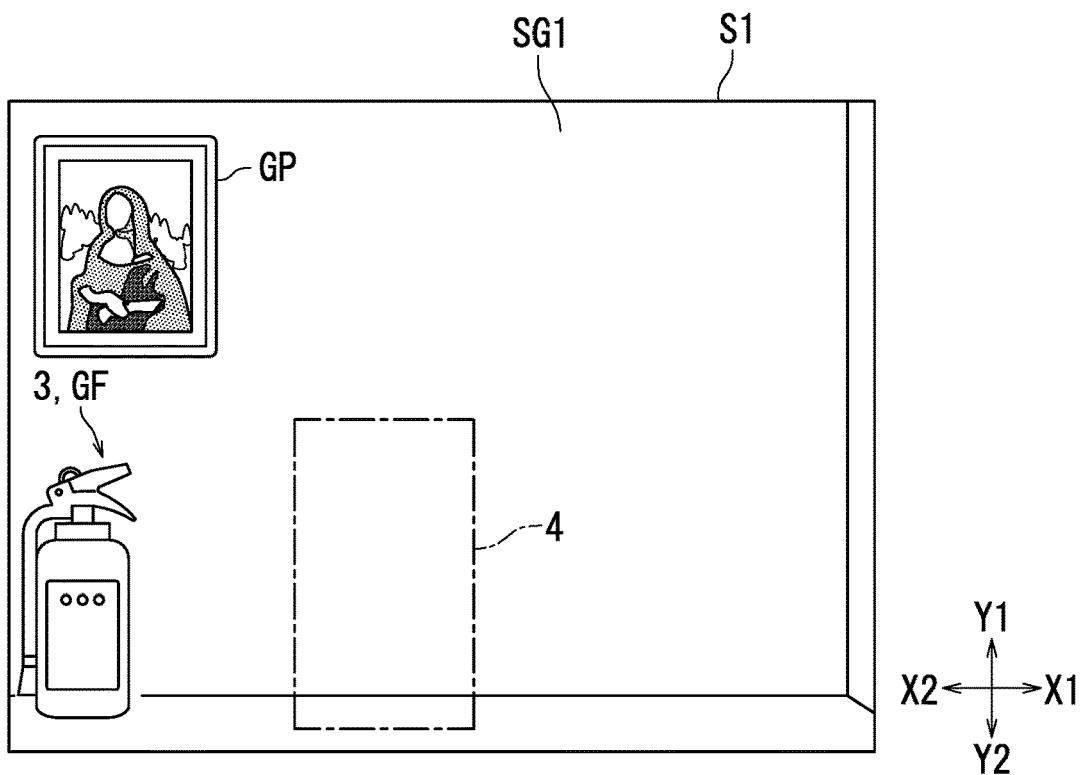
FIG. 9 is a diagram illustrating a second additional example of the captured image after the detection target image shown in FIG. 2 has been moved.
Figure 10:
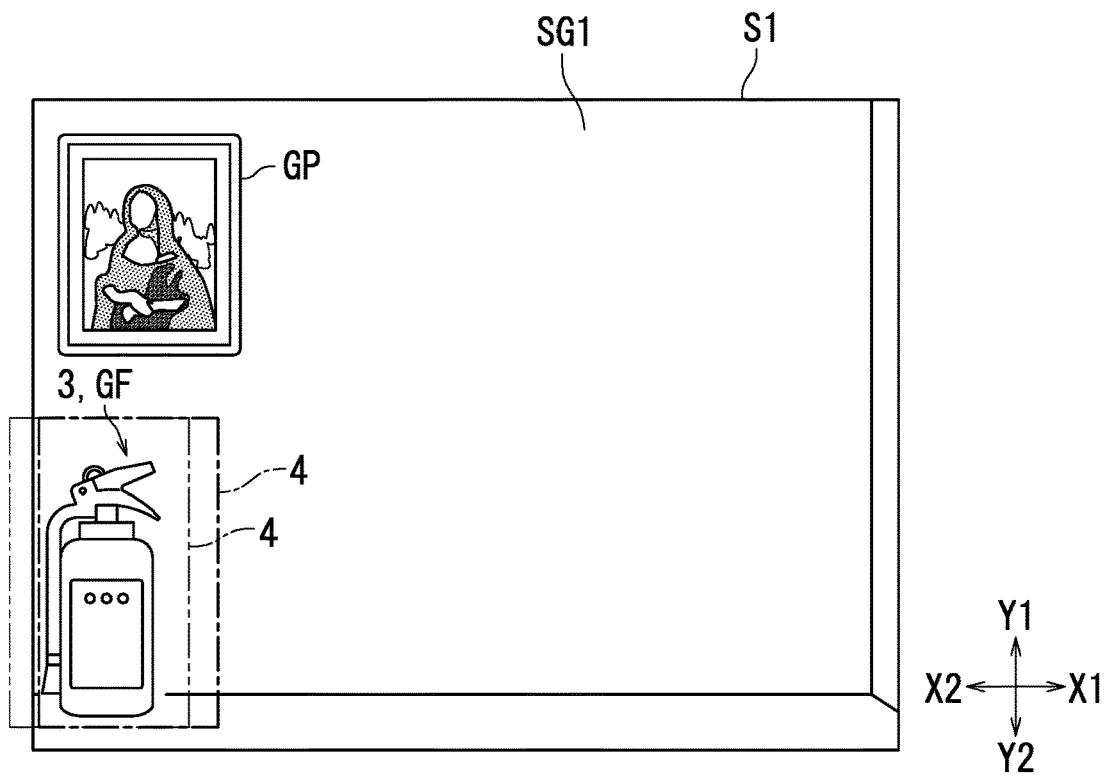
FIG. 10 is a diagram illustrating an example of the captured image after the detection range shown in FIG. 9 has been changed.

First, the detection range 4 according to the second embodiment will be described with reference to FIGS. 9 and 10. FIG. 9 is a diagram illustrating a second additional example of the captured image SG1 after the detection target image 3 shown in FIG. 2 has been moved. FIG. 10 is a diagram illustrating an example of the captured image SG1 after the detection range 4 shown in FIG. 9 has been changed. Note that the detection range 4 changed based on the relative position data (refer to the first embodiment) is represented by dashed and double dotted lines in FIG. 10.

In a situation in which the moved detection target image 3 is located at an end of the captured image SG1 and the position of the detection range 4 is changed based on the relative position data, a portion of the changed detection range 4 may fall outside of the captured image SG1. For example, in a situation in which the moved detection target image 3 is located at an end of the captured image SG1 in an X2 direction and the position of the detection range 4 is changed based on the relative position data as illustrated in FIGS. 9 and 10, a portion of the outline of the detection range 4 adjacent to the X2 side falls outside of the captured image SG1. According to the present embodiment, in a situation in which a portion of the outline of the detection range 4 falls outside of the captured image SG1 as a result of the detection range 4 being moved based on the relative position data, the device controller 55 further changes the position of the detection range 4 so that the entirety of the outline of the detection range 4 is located within the captured image SG1. In the example illustrated in FIG. 10, the device controller 55 further moves the detection range 4 toward the X1 side so that the portion of the outline of the detection range 4 adjacent to the X2 side becomes located within the captured image SG1. Specifically, the device controller 55 moves the detection range 4 toward the X1 side so that the x-coordinate of the portion of the outline of the detection range 4 adjacent to the X2 side has a value of "0". In the example illustrated in FIG. 10, the x-coordinate of the position in which the first identification pixel G1 of the detection range 4 changed based on the relative position data is displayed has a negative value.

Figure 11:
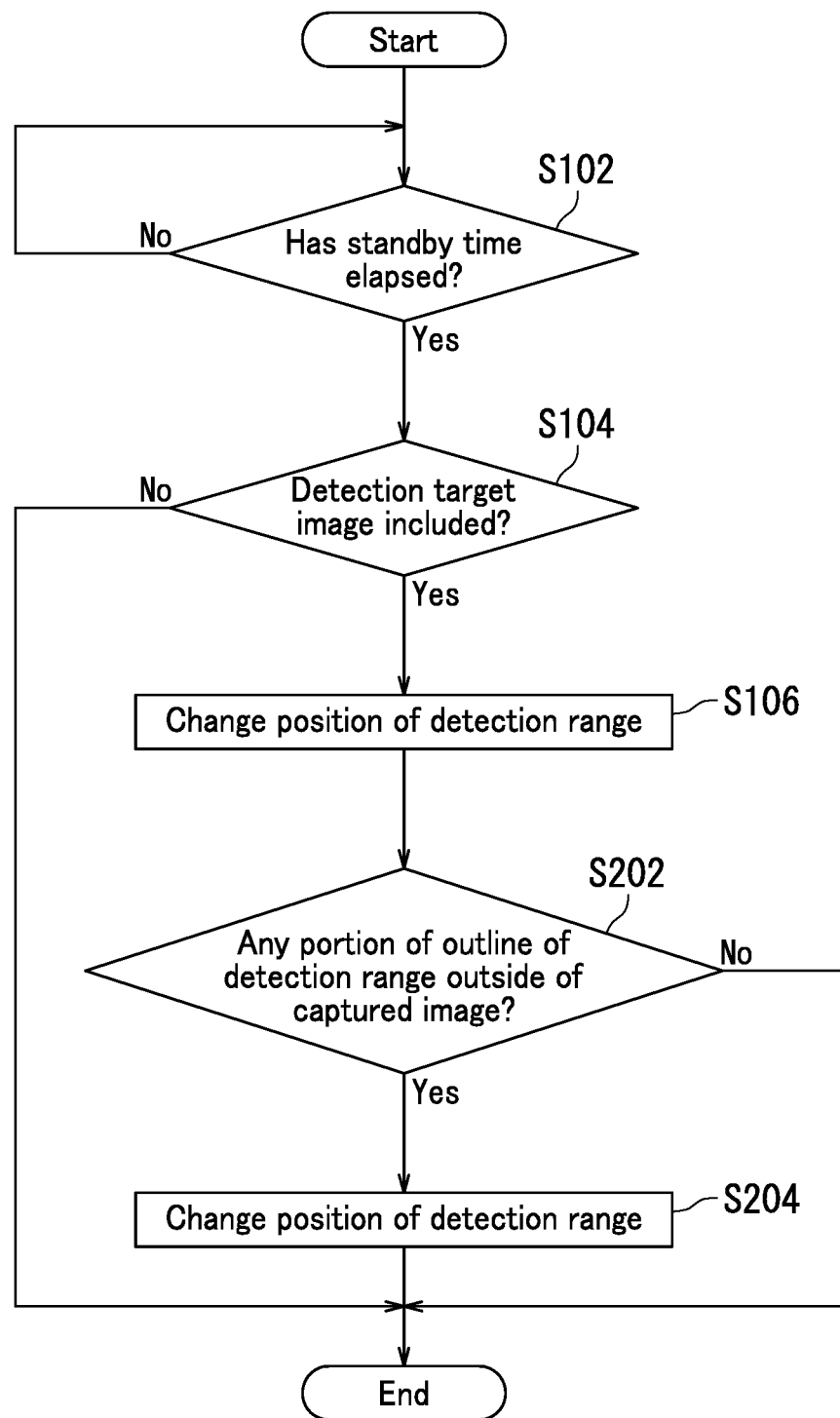
FIG. 11 is a flowchart illustrating a detection range changing process according to a second embodiment of the present disclosure.

FIG. 11 is a flowchart illustrating a detection range changing process according to the second embodiment. As illustrated in FIG. 11, upon changing the position of the detection range 4 based on the relative position data (Step S106), the device controller 55 determines whether or not any portion of the outline of the changed detection range 4 falls outside of the captured image SG1 (Step S202). Upon determining that a portion of the outline of the detection range 4 falls outside of the captured image SG1 (Yes in Step S202), the device controller 55 changes the position of the detection range 4 so that the entirety of the outline of the detection range 4 becomes located within the captured image SG1 (Step S204) and ends the detection range changing process. On the other hand, upon determining that no portion of the outline of the detection range 4 falls outside of the captured image SG1 (No in Step S202), the device controller 55 ends the detection range changing process.

Through the above, the second embodiment has been described. According to the present embodiment, in a situation in which a portion of the outline of the changed detection range 4 falls outside of the captured image SG1, the device controller 55 changes the position of the detection range 4 so that the entirety of the outline of the detection range 4 becomes located within the captured image SG1. This offloads the work associated with setting of the detection range 4 from the administrator.

Figure 12:
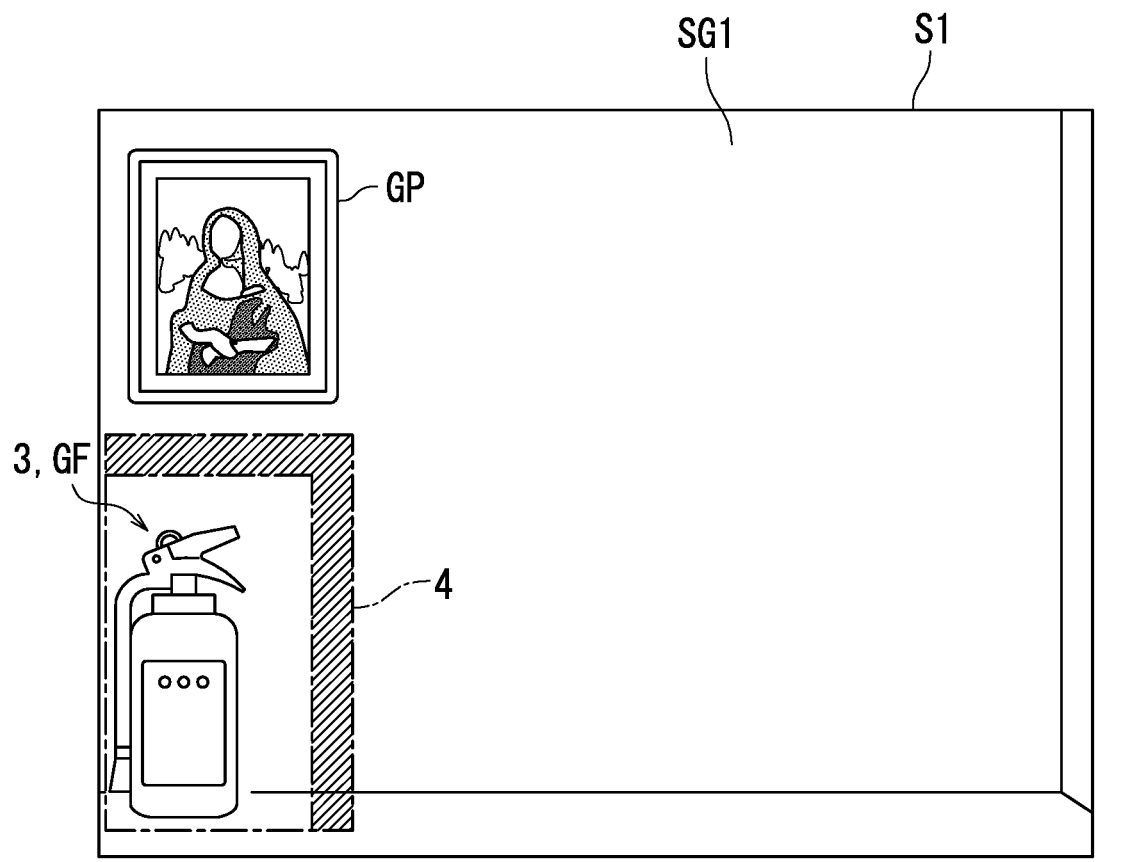
FIG. 12 is a diagram illustrating another example of the captured image after the detection range shown in FIG. 9 has been changed.

According to the present embodiment, the device controller 55 moves the detection range 4 so that the entirety of the outline of the detection range 4 becomes located within the captured image SG1 in a situation in which a portion of the outline of the detection range 4 falls outside of the captured image SG1. However, the method is not limited so long as the entirety of the outline of the detection range 4 becomes located within the captured image SG1. For example, size or shape of the detection range 4 may be altered so that the entirety of the outline of the detection range 4 becomes located within the captured image SG1. Specifically, as illustrated in FIG. 12, the device controller 55 may delete the detection range 4 that falls outside of the captured image SG1 and expand the detection range 4 in the X1 direction and a Y1 direction. A region indicated by hatching in FIG. 12 is an area of the expansion. FIG. 12 is a diagram illustrating another example of the captured image SG1 after the detection range 4 shown in FIG. 9 has been changed. Preferably, the size of the detection range 4 is changed so that the size of the detection range 4 after the change is larger than or equal to the size of the detection range 4 before the change. Thus, for example an image change that occurs around the detection target, such as a person approaching the detection target, can be detected. As a result, an event happening to the detection target can be detected sooner.

Third Embodiment

The following describes a monitoring system 100 according to a third embodiment with reference to FIGS. 1, 2, and 13 to 15. The third embodiment is different from the first and second embodiments in that the size of the detection range 4 is changed depending on a change in size of the detection target image 3.

Figure 13:
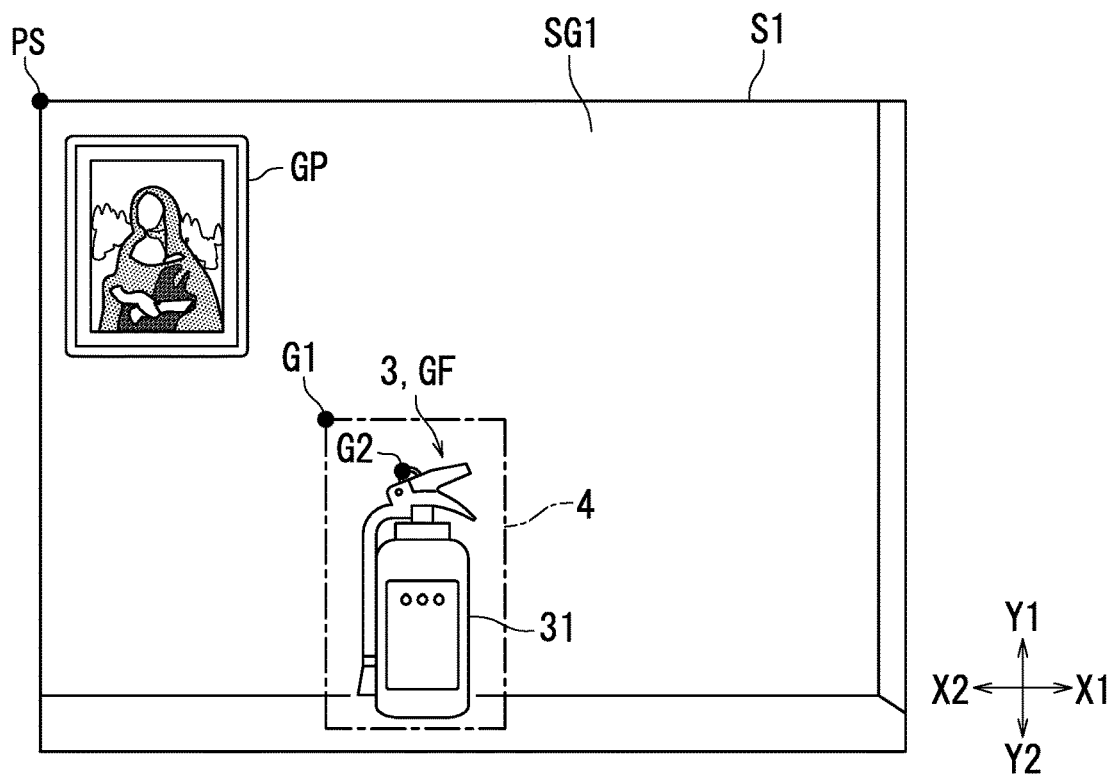
FIG. 13 is a diagram illustrating an example of the captured image according to a third embodiment of the present disclosure.
Figure 14:
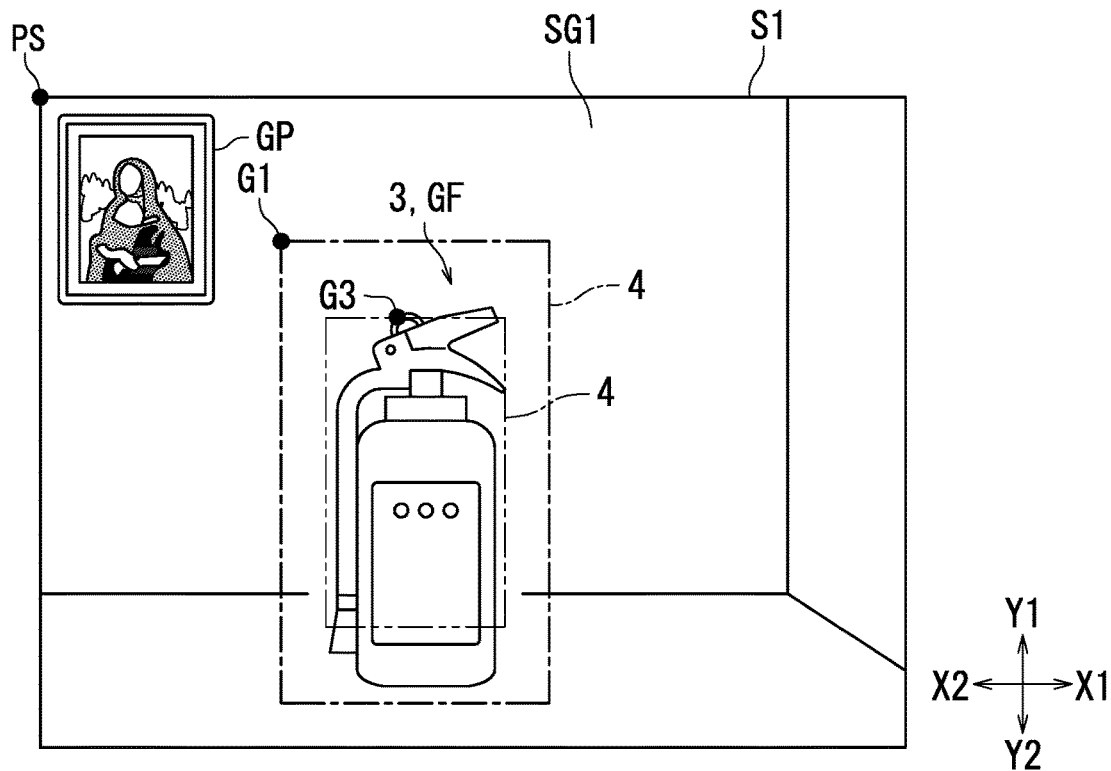
FIG. 14 is a diagram illustrating an example of the captured image after the detection target shown in FIG. 13 has been moved.

FIG. 13 is a diagram illustrating an example of the captured image SG1 according to the third embodiment. FIG. 14 is a diagram illustrating an example of the captured image SG after the detection target shown in FIG. 13 has been moved. Note that the detection range 4 before the change (the detection range 4 shown in FIG. 13) is represented by dashed and double dotted lines in FIG. 14 in order to facilitate understanding.

According to the present embodiment, in a situation in which the detection target is moved toward or away from the first camera 1, the device controller 55 changes the size of the detection range 4 depending on the change in the detection target image 3. Specifically, in a situation in which the detection target is moved toward or away from the first camera 1, the camera controller 14 controls operation of the image sensor 11 so as to focus the image sensor 11 on the detection target (performs an automatic focus function). Upon changing the focal position so as to focus the image sensor 11 on the detection target, the camera controller 14 transmits focal length change data indicating a distance between the focal position before the change and the focal position after the change to the device communication section 51 through the camera communication section 12 in addition to the captured image data and the change detection data.

Upon the device communication section 51 receiving the focal length change data, the device controller 55 enlarges or reduces the recognition image indicated by the recognition image data stored in the device storage 54 based on the focal length change data. The device controller 55 searches the captured image SG1 for the detection target image 3 using the enlarged or reduced recognition image and determines the position in which the third identification pixel G3 of the detection target image 3 is displayed as described with reference to FIG. 4.

The device controller 55 also determines the position in which the first identification pixel G1 is to be displayed based on the focal length change data, the relative position data, and data indicating the position (coordinates) in which the third identification pixel G3 is displayed, and then changes the position of the detection range 4 as described with reference to FIG. 4. Specifically, the device controller 55 determines the position in which the first identification pixel G1 is to be displayed so that the third identification pixel G3 and the first identification pixel G1 have a distance therebetween that is extended or shortened based on the focal length change data.

Thereafter, the device controller 55 increases or reduces the size of the detection range 4 based on the focal length change data.

In the example illustrated in FIGS. 13 and 14, the detection target is moved toward the first camera 1. Accordingly, the device controller 55 enlarges the recognition image. Next, the device controller 55 searches the captured image SG1 for the detection target image 3 using the enlarged recognition image. The device controller 55 acquires the third identification pixel G3 from the pixels making up the detection target image 3 that is found.

In the example illustrated in FIG. 14, the third identification pixel G3 is a pixel displayed in a position closest to the origin PS of the display surface of the display section S1 among the pixels making up the detection target image 3. Note that the device controller 55 acquires a pixel displayed on the farthest Y1 side as the third identification pixel G3 in a situation in which there is a plurality of pixels displayed in a position closest to the origin PS of the display surface of the display section S1. The device controller 55 then determines the position in which the first identification pixel G1 is to be displayed based on the data indicating the position in which the third identification pixel G3 is displayed, the relative position data, and the focal length change data. The device controller 55 then moves the position of the detection range 4 so that the first identification pixel G1 is displayed in the thus determined position. Thereafter, the device controller 55 increases the size of the detection range 4 based on the focal length change data received by the device communication section 51.

Figure 15:
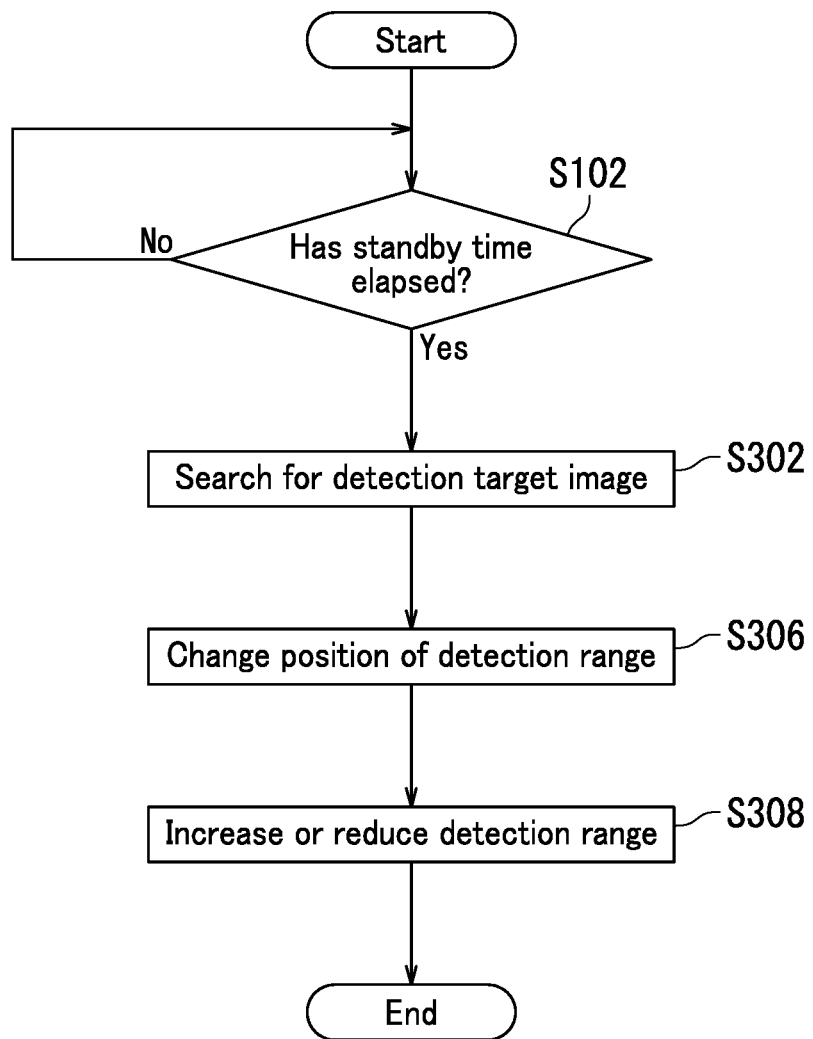
FIG. 15 is a flowchart illustrating a detection range changing process according to the third embodiment of the present disclosure.

The following describes a detection range changing process according to the third embodiment with reference to FIG. 15. FIG. 15 is a flowchart illustrating the detection range changing process according to the third embodiment. The detection range changing process according to the present embodiment starts once the device communication section 51 has received the focal length change data in addition to the change detection data.

As illustrated in FIG. 15, upon determining that the standby time has elapsed (Yes in Step S102), the device controller 55 searches for the detection target image 3 (Step S302). Specifically, the device controller 55 searches the captured image SG1 for an image that matches the recognition image based on the captured image data received by the device communication section 51, the focal length change data received by the device communication section 51, and the recognition image data stored in the device storage 54. More specifically, the device controller 55 enlarges or reduces the recognition image indicated by the recognition image data stored in the device storage 54 based on the focal length change data and searches the captured image SG1 for the detection target image 3 using the enlarged or reduced recognition image. Upon finding the detection target image 3, the device controller 55 acquires the position in which the third identification pixel G3 is displayed. Next, the device controller 55 changes the position of the detection range 4 (Step S306). Specifically, the device controller 55 determines the position in which the first identification pixel G1 is to be displayed based on the focal length change data, the relative position data, and the data indicating the position in which the third identification pixel G3 is displayed, and then changes the position of the detection range 4. Next, the device controller 55 increases or reduces the size of the detection range 4 based on the focal length change data (Step S308), and ends the detection range changing process. Note that the order of steps S306 and S308 can be reversed.

Through the above, the third embodiment has been described. According to the present embodiment, in a situation in which the detection target is moved toward or away from the first camera 1, the device controller 55 changes the position and the size of the detection range 4 depending on the position of the moved detection target image 3. This offloads the work associated with setting of the detection range 4 from the administrator.

Fourth Embodiment

The following describes a monitoring system 100 according to a fourth embodiment of the present disclosure with reference to FIGS. 16 to 22. The fourth embodiment is different from the first to third embodiments in that the fourth embodiment includes a plurality of cameras. The following describes differences between the fourth embodiment and the first to third embodiments, and redundant description shared with the first to third embodiments is omitted to avoid repetition.

Figure 16:
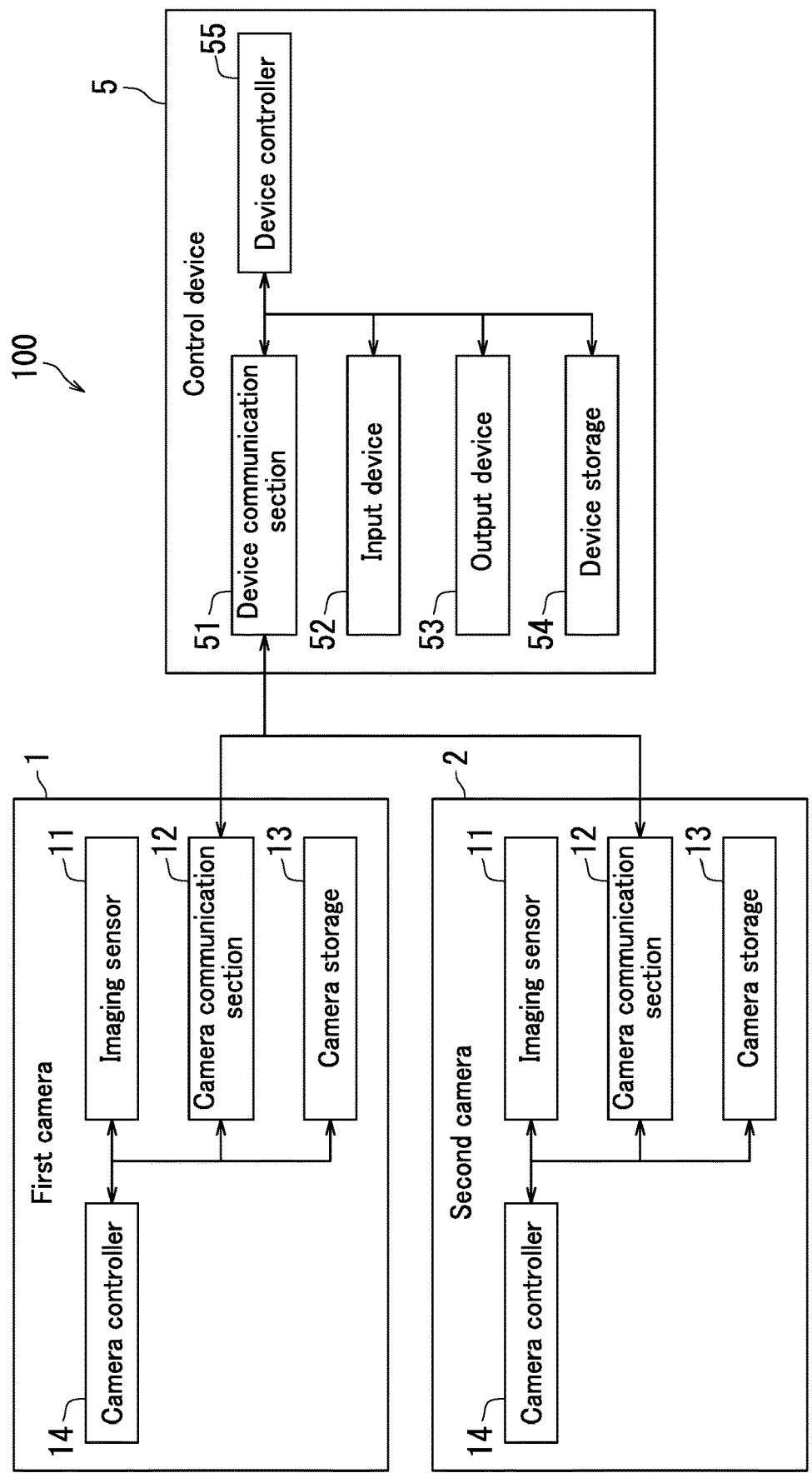
FIG. 16 is a diagram illustrating a configuration of a monitoring system according to a fourth embodiment of the present disclosure.

The following first describes a configuration of the monitoring system 100 according to the fourth embodiment with reference to FIG. 16. FIG. 16 is a diagram illustrating the configuration of the monitoring system 100 according to the fourth embodiment. As illustrated in FIG. 16, the monitoring system 100 includes a second camera 2 in addition to the first camera 1. The second camera 2 captures an image of a different imaging area from that covered by the first camera 1. The imaging area covered by the first camera 1 is referred to below as a "first imaging area", and the imaging area covered by the second camera 2 is referred to below as a "second imaging area". The captured image SG1 provided by the first camera 1 is referred to below as a "first captured image SG1", and a captured image SG2 provided by the second camera 2 is referred to below as a "second captured image SG2". According to the present embodiment, the first imaging area and the second imaging area are adjacent to each other but do not overlap. The second camera 2 is an example of what is referred to as a second imaging device.

As illustrated in FIG. 16, the second camera 2 includes an image sensor 11, a camera communication section 12, camera storage 13, and a camera controller 14.

The image sensor 11, the camera communication section 12, the camera storage 13, and the camera controller 14 of the second camera 2 have substantially the same configuration as the image sensor 11, the camera communication section 12, the camera storage 13, and the camera controller 14 of the first camera 1. Description of the configuration of the image sensor 11, the camera communication section 12, the camera storage 13, and the camera controller 14 of the second camera 2 is therefore omitted.

The camera communication section 12 of the second camera 2 transmits captured image data to the device communication section 51. The camera controller 14 of the second camera 2 also transmits change detection data to the device communication section 51 through the camera communication section 12 of the second camera 2 upon detecting a change to the captured image.

Figure 17:
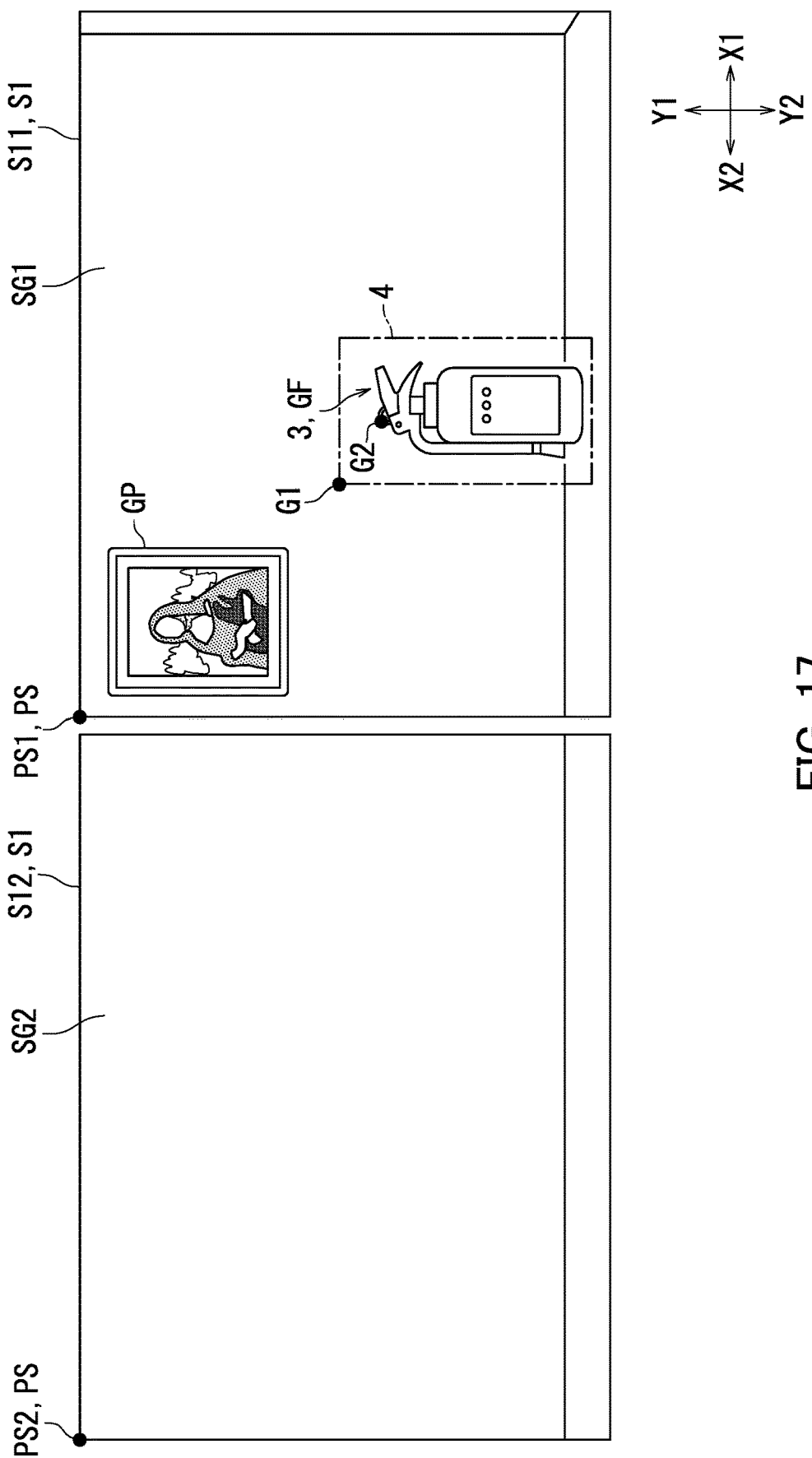
FIG. 17 is a diagram illustrating an example of a first captured image and a second captured image according to the fourth embodiment of the present disclosure.
Figure 18:
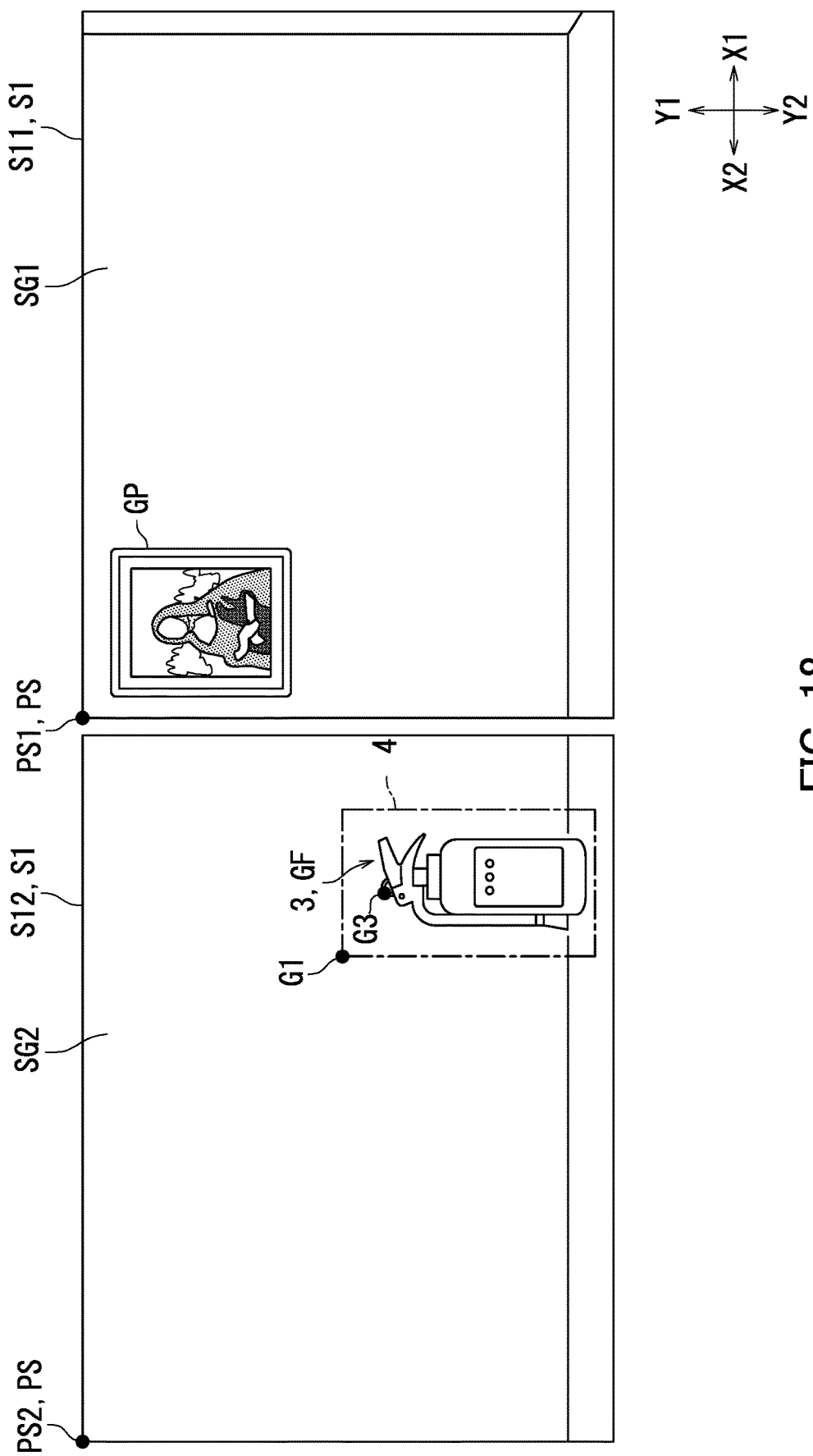
FIG. 18 is a diagram illustrating an example of the first captured image and the second captured image after the detection target image shown in FIG. 17 has been moved.

The following then describes a process to be performed by the monitoring system 100 according to the fourth embodiment with reference to FIGS. 16 to 18.

FIG. 17 is a diagram illustrating an example of the first captured image SG1 and the second captured image SG2 according to the fourth embodiment. FIG. 18 is a diagram illustrating an example of the first captured image SG1 and the second captured image SG2 after the detection target image 3 shown in FIG. 17 has been moved. In the example illustrated in FIGS. 17 and 18, the detection target is moved from the first imaging area to the second imaging area. A portion of the display section 51 in which the first captured image SG1 is displayed is referred to below as a "first display section S11", and a portion of the display section S1 in which the second captured image SG2 is displayed is referred to below as a "second display section S12". The origin PS of the first display section S11 is referred to below as a "first origin PS1", and the origin PS of the second display section S12 is referred to below as a "second origin PS2".

Upon the camera controller 14 of the first camera 1 detecting a change to the captured image in the detection range 4 as a result of the detection target being moved as illustrated in FIGS. 17 and 18, the change detection data is transmitted from the camera communication section 12 of the first camera 1 to the device communication section 51. Upon the device communication section 51 receiving the change detection data, the device controller 55 stores, in the device storage 54, captured image data transmitted by the camera communication section 12 of the first camera 1 and the camera communication section 12 of the second camera 2 and received by the device communication section 51, and then performs a detection range changing process. The captured image data transmitted by the camera communication section 12 of the first camera 1 is referred to below as "first captured image data", and the captured image data transmitted by the camera communication section 12 of the second camera 2 is referred to below as "second captured image data".

In the detection range changing process according to the present embodiment, the device controller 55 determines whether or not the first captured image SG1 or the second captured image SG2 includes the detection target image 3 based on the first captured image data and the second captured image data. Upon determining that the first captured image SG1 or the second captured image SG2 includes the detection target image 3, the device controller 55 determines the camera that has provided the captured image including the detection target image 3 among the first captured image SG1 and the second captured image SG2 to be a main camera. In other words, the device controller 55 determines the camera that has captured an image of the entirety of the detection target to be the main camera. Upon determining the main camera, the device controller 55 changes the position of the detection range 4 as described with reference to FIG. 4 so that the detection range 4 encloses the detection target image 3 in the captured image provided by the main camera. The captured image provided by the main camera is referred to as a main captured image.

In the example illustrated in FIG. 18, the second captured image SG2 includes the detection target image 3. Accordingly, the device controller 55 determines the second camera 2 to be the main camera. The device controller 55 then changes the position of the detection range 4 so that the detection range 4 encloses the detection target image 3 in the second captured image SG2 provided by the second camera 2. Specifically, the device controller 55 changes the position of the detection range 4 so that a relationship between relative positions of one (the third identification pixel G3) of pixels making up the detection target image 3 (the moved detection target image 3) and one (the first identification pixel G1) of pixels making up the outline of the detection range 4 matches the relationship between the relative positions indicated by the relative position data in the main captured image (the second captured image SG2) provided by the main camera. For example, the device controller 55 acquires, as the third identification pixel G3, a pixel displayed in a position closest to the second origin PS2 of a display surface of the second display section S12 from the pixels making up the moved detection target image 3 and acquires the position in which the third identification pixel G3 is displayed. Note that the device controller 55 acquires a pixel displayed on the farthest Y1 side as the third identification pixel G3 in a situation in which there is a plurality of pixels displayed in a position closest to the second origin PS2 of the display surface of the second display section S12.

The device controller 55 determines the position (coordinates) in which the first identification pixel G1 is to be displayed based on data indicating the position in which the third identification pixel G3 is displayed and the relative position data stored in the device storage 54. In other words, the device controller 55 changes the position of the detection range 4 so that the relationship between the relative positions of the first identification pixel G1 and the third identification pixel G3 matches the relationship between the relative positions indicated by the relative position data.

Figure 19:
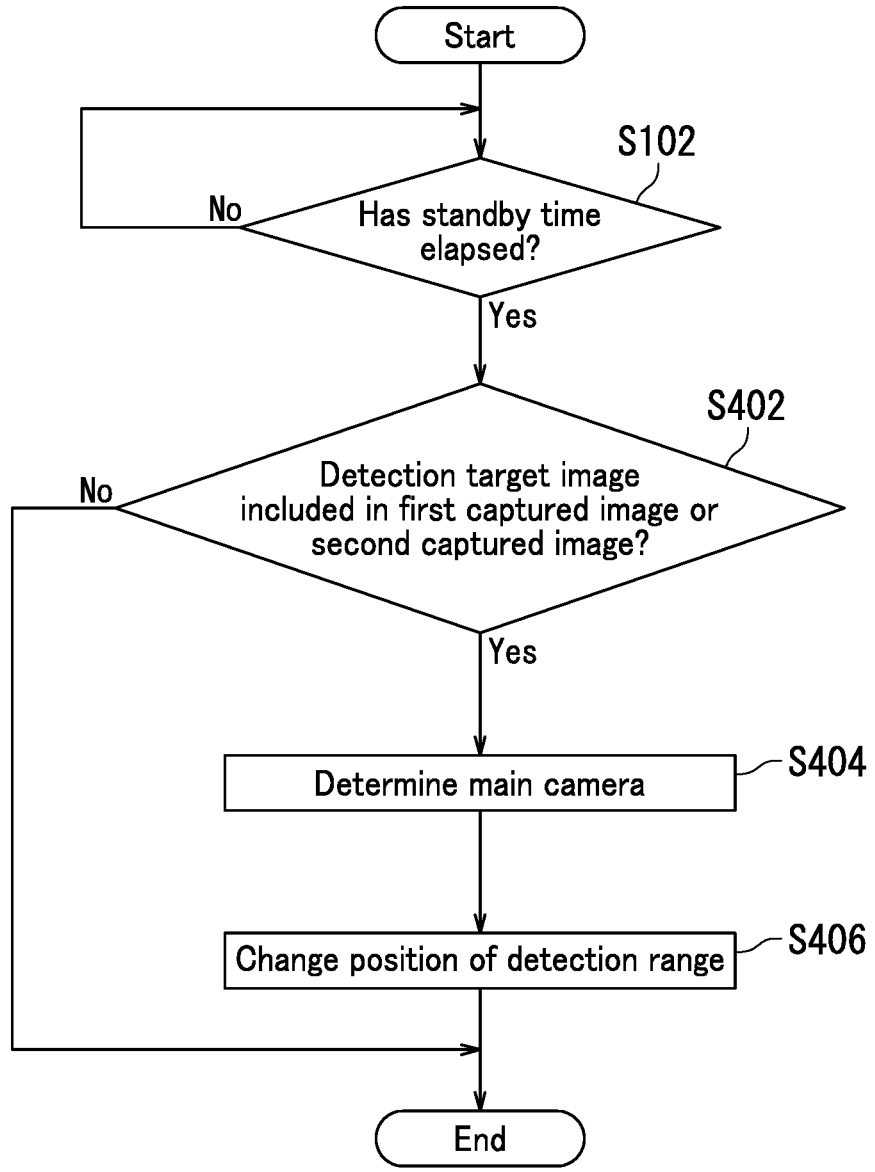
FIG. 19 is a flowchart illustrating a detection range changing process according to the fourth embodiment of the present disclosure.

The following describes the detection range changing process according to the fourth embodiment with reference to FIGS. 16 to 19. FIG. 19 is a flowchart illustrating the detection range changing process according to the fourth embodiment.

As illustrated in FIG. 19, upon determining that the standby time has elapsed (Yes in Step S102), the device controller 55 searches the first captured image SG1 or the second captured image SG2 for an image that matches the recognition image (the detection target image 3) and determines whether or not the detection target image 3 is included in the first captured image SG1 or the second captured image SG2 based on the first captured image data and the second captured image data received by the device communication section 51 (Step S402). Specifically, the device controller 55 analyzes the first captured image data or the second captured image data to determine whether or not the detection target image 3 is included in the first captured image SG1 or the second captured image SG2.

Upon determining that the detection target image 3 is included in the first captured image SG1 or the second captured image SG2 (Yes in Step S402), the device controller 55 determines the main camera (Step S404). Specifically, the device controller 55 determines the camera that has provided the captured image including the detection target image 3 among the first captured image SG1 and the second captured image SG2 to be the main camera.

Next, the device controller 55 changes the position of the detection range 4 so that the detection range 4 encloses the detection target image 3 in the main captured image provided by the main camera (Step S406). Specifically, the device controller 55 acquires the third identification pixel G3 from the pixels making up the moved detection target image 3 and changes the position of the detection range 4 so that the relationship between the relative positions of the first identification pixel G1 and the third identification pixel G3 matches the relationship between the relative positions indicated by the relative position data. The device controller 55 then transmits the detection range data indicating the changed detection range 4 to the camera communication section 12 of the main camera through the device communication section 51. Upon the camera communication section 12 receiving the detection range data indicating the changed detection range 4, the camera controller 14 of the main camera stores the detection range data indicating the changed detection range 4 in the camera storage 13 of the main camera. Alternatively, the camera controller 14 of the main camera updates the detection range data stored in the camera storage 13 of the main camera to the detection range data indicating the changed detection range 4. Thus, the detection range changing process is completed.

On the other hand, upon determining that the detection target image 3 is not included in the first captured image SG1 or the second captured image SG2 (No in Step S402), the device controller 55 ends the detection range changing process and directs the device communication section 51 to notify that the detection target has been removed. Specifically, the device controller 55 sends an e-mail indicating that the detection target has been removed to the administrator through the device communication section 51. Alternatively, the device controller 55 directs the output device 53 to display a message indicating that the detection target has been removed.

Through the above, the fourth embodiment has been described. According to the present embodiment, it is not necessary to reset the detection range 4 even if the detection target is moved from an imaging area (the first imaging area) covered by a camera (the first camera 1) to an imaging area (the second imaging area) covered by a different camera (the second camera 2). This offloads the work associated with setting of the detection range 4 from the administrator.

Figure 20:
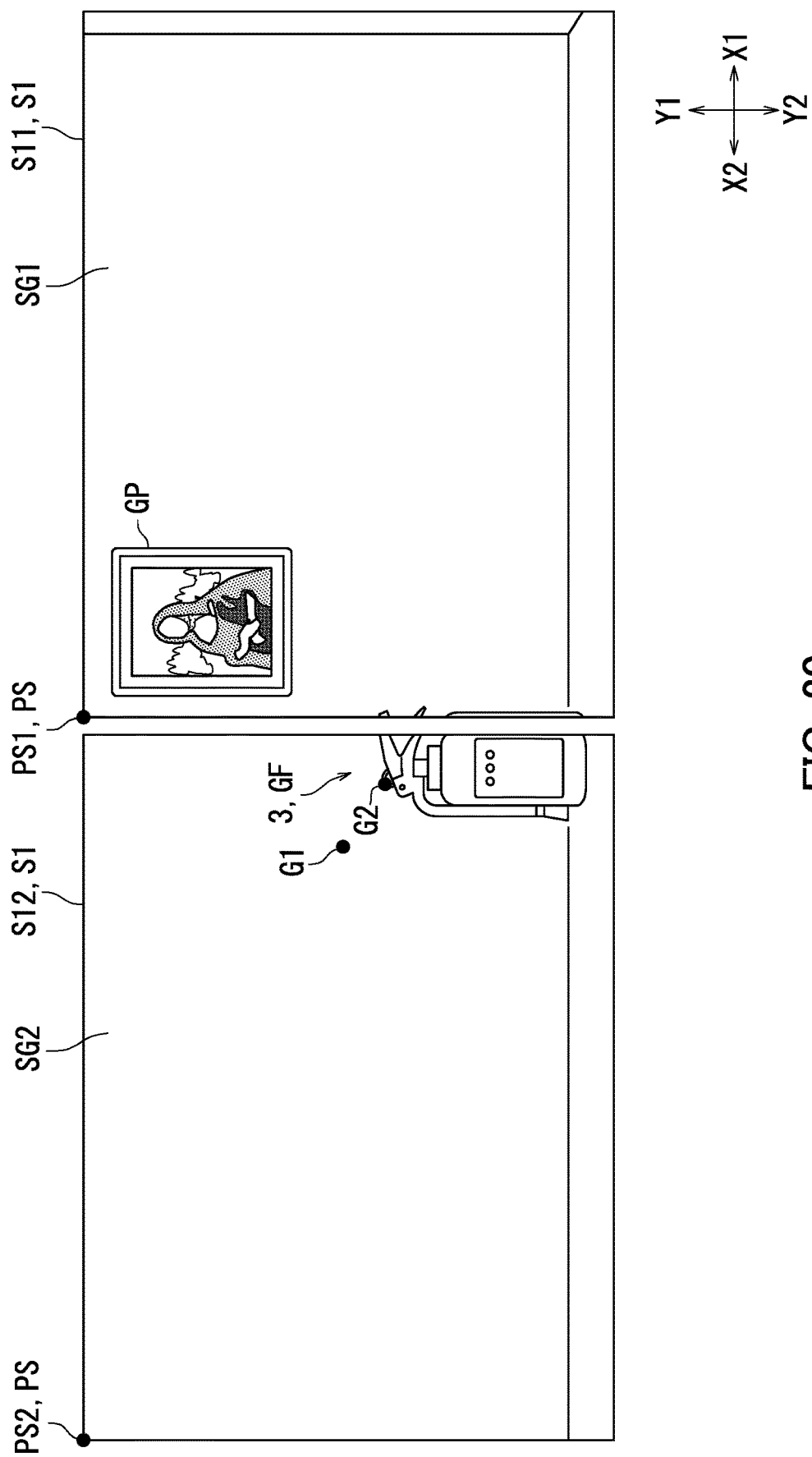
FIG. 20 is a diagram illustrating another example of the first captured image and the second captured image after the detection target image shown in FIG. 17 has been moved.

Although a configuration of the present embodiment has been described as an example in which either the first captured image SG1 or the second captured image SG2 includes the detection target image 3, the first captured image SG1 may include an image exhibiting a portion of the detection target and the second captured image SG2 may include an image exhibiting another portion of the detection target. FIG. 20 is a diagram illustrating another example of the first captured image SG1 and the second captured image SG2 after the detection target image 3 shown in FIG. 17 has been moved. As illustrated in FIG. 20, for example, the first captured image SG1 and the second captured image SG2 may respectively include images exhibiting different portions of the detection target. In such a situation, the device controller 55 specifies a captured image whose image exhibiting a portion of the detection target has a larger area among the first captured image SG1 and the second captured image SG2, and then determines the camera that has provided the thus specified captured image to be the main camera.

In the example illustrated in FIG. 20, the second camera 2 that has provided the second captured image SG2 is determined to be the main camera. Upon determining the main camera, the device controller 55 acquires the third identification pixel G3 from the pixels making up the moved detection target image 3 and determines the position in which the first identification pixel G1 is to be displayed so that the relationship between the relative positions of the first identification pixel G1 and the third identification pixel G3 matches the relationship between the relative positions indicated by the relative position data. Note that in a situation in which a portion of the outline of the changed detection range 4 falls outside of the imaging area covered by the main camera, the device controller 55 may further move the detection range 4 so that the entirety of the outline of the detection range 4 becomes located within the captured image SG1 as described with reference to FIG. 10.

Figure 21:
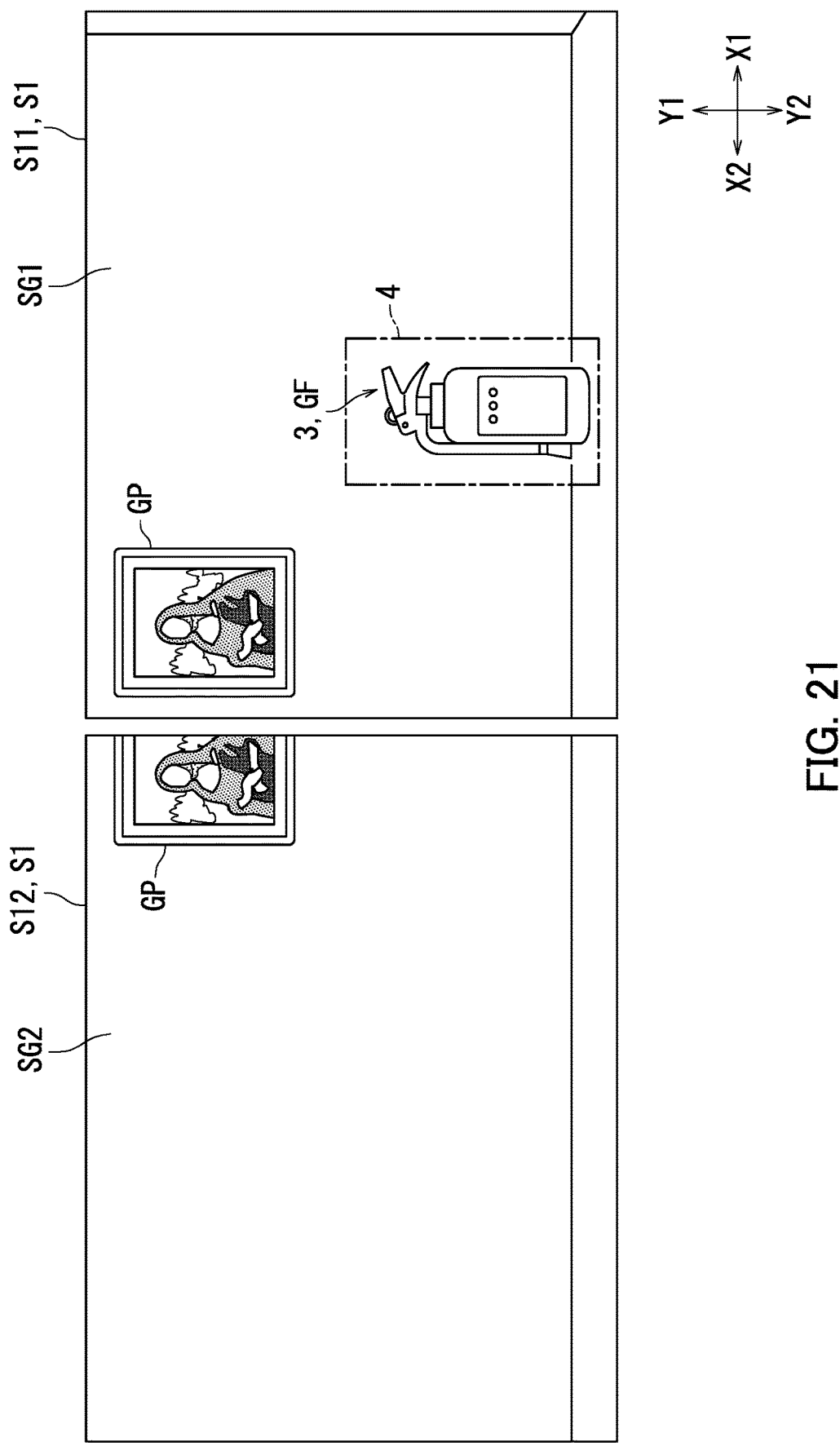
FIG. 21 is a diagram illustrating another example of the first captured image and the second captured image according to the fourth embodiment of the present disclosure.
Figure 22:
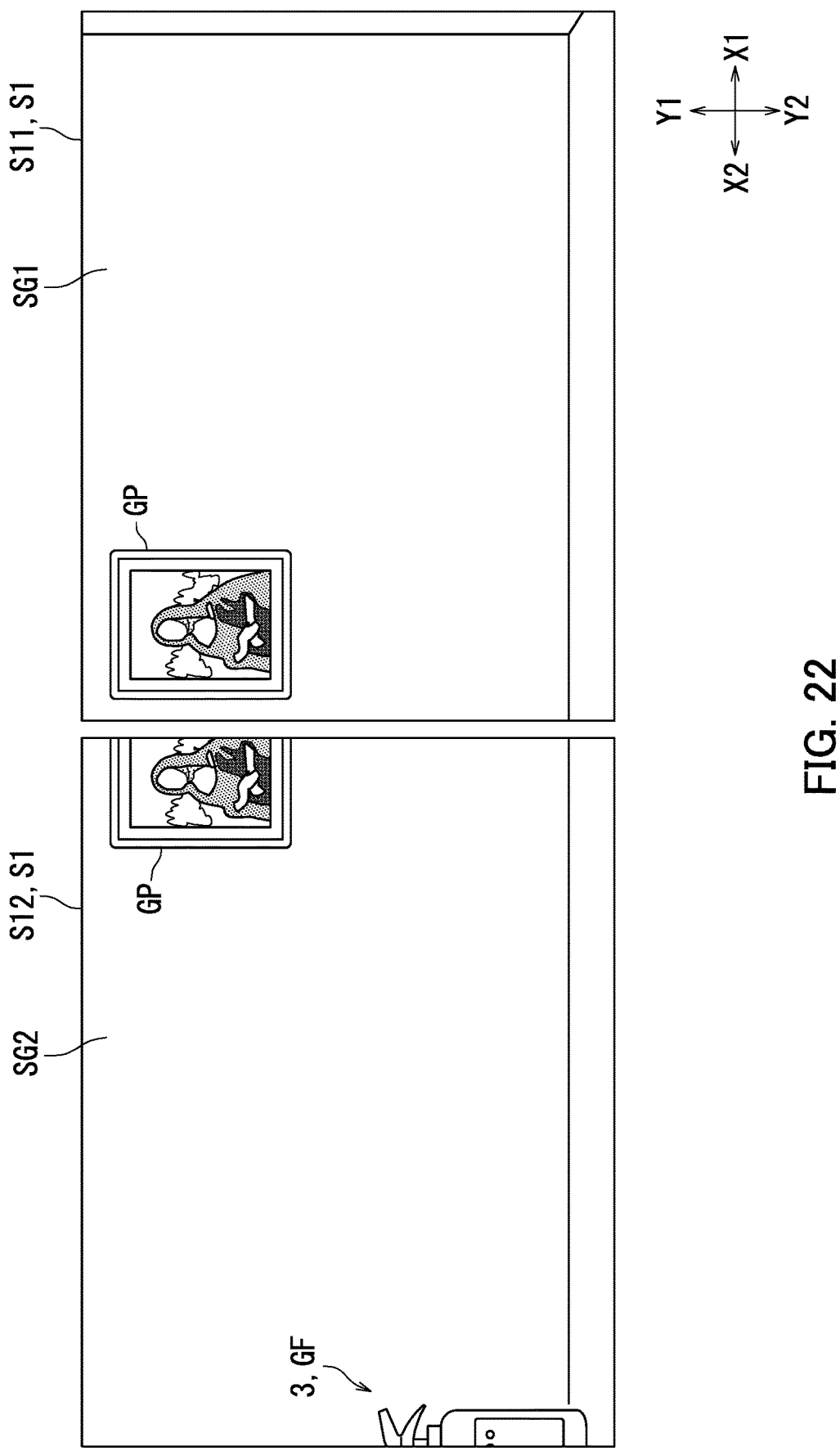
FIG. 22 is a diagram illustrating an example of the first captured image and the second captured image after the detection target image shown in FIG. 21 has been moved.

Although a configuration of the present embodiment has been described as an example in which the first imaging area and the second imaging area do not overlap, the first imaging area and the second imaging area may partially overlap. FIG. 21 is a diagram illustrating another example of the first captured image SG1 and the second captured image SG2 according to the fourth embodiment. FIG. 22 is a diagram illustrating an example of the first captured image SG1 and the second captured image SG2 after the detection target image 3 shown in FIG. 21 has been moved.

As illustrated in FIGS. 21 and 22, the first imaging area and the second imaging area may overlap, and either or both of the first captured image SG1 and the second captured image SG2 may include an image exhibiting a portion of the moved detection target (in the example illustrated in FIG. 22, the second captured image SG2 includes an image exhibiting a portion of the moved detection target). In such a situation, the device controller 55 notifies the administrator of a message prompting the administrator to move the detection target so that the first captured image SG1 or the second captured image SG2 includes an image (the detection target image 3) exhibiting the entirety of the detection target. In other words, the device controller 55 notifies the administrator of a message prompting the administrator to move the detection target so that either the first camera 1 or the second camera 2 captures an image of the entirety of the detection target. Specifically, the device controller 55 sends an e-mail to the administrator through the device communication section 51. For example, the device controller 55 attaches the first captured image data and the second captured image data to the e-mail that is sent to the administrator through the device communication section 51. Thus, the administrator can easily know how far to move the detection target by visually referring to the first captured image SG1 and the second captured image SG2.

Embodiments of the present disclosure have been described above with reference to the drawings (FIGS. 1 to 22). However, the present disclosure is not limited to the above embodiments and may be implemented in various different forms that do not deviate from the essence of the present disclosure. The configurations described in association with the above embodiments are merely examples and are in no way limiting. Various alterations can be made thereto within the scope not substantially departing from the effect of the present disclosure.

For example, although a configuration of an embodiment of the present disclosure has been described as an example in which the control device 5 is a server, the present disclosure is not limited as such. The present disclosure may for example have a configuration in which the control device 5 is an administrator terminal such as a personal computer that is used by the administrator. Alternatively, the control device 5 may include a server and an administrator terminal connected to the server.

For another example, although a configuration of an embodiment of the present disclosure has been described as an example in which the monitoring system 100 includes two cameras, the number of cameras included in the monitoring system 100 is not limited to two. The monitoring system 100 may include three or more cameras.

Matter described in association with the first to fourth embodiments may be combined as appropriate. For example, the configuration described in association with the second embodiment and the configuration described in association with the third embodiment may be combined.

What is claimed is:

1. A monitoring system for detecting an event happening to a detection target, comprising:
    a first imaging device configured to capture an image of a first imaging area including the detection target to generate first captured image data indicating a first captured image;
    a second imaging device configured to capture an image of a second imaging area differing from the first imaging area to generate second captured image data indicating a second captured image;
    first storage configured to store therein data indicating a detection range;
    a controller configured to detect a change to the first captured image or the second captured image in the detection range based on the first captured image data or the second captured image data; and
    a notification device configured to notify a user of information, wherein
    the detection range includes a detection target image exhibiting the detection target,
    in a situation in which the first captured image and the second captured image respectively include images exhibiting different portions of the detection target, the controller determines one of the first and second imaging devices that has provided a captured image whose image exhibiting a portion of the detection target has a larger area among the first and second captured images to be a main imaging device,
    in a situation in which the first captured image or the second captured image includes an image exhibiting a portion of the detection target, the controller directs the notification device to notify the user of a message prompting the user to move the detection target so that one imaging device of the first imaging device and the second imaging device that captures the image exhibiting the portion of the detection target captures an image of an entirety of the detection target, and determines an imaging device capturing the entirety of the detection target to be a main imaging device, and
    upon detecting a change to a captured image in the detection range captured by the main imaging device, the controller changes the detection range of the main imaging device so that the detection range encloses the detection target image.

2. The monitoring system according to claim 1, wherein the controller acquires a change in size of the detection target image and changes the detection range depending on the change in the size of the detection target image.

3. The monitoring system according to claim 1, further comprising:
    second storage configured to store therein a recognition image of the detection target, wherein
    in a situation in which a percentage of match between the recognition image and the detection target image is lower than a threshold, the controller directs the notification device to notify the user of a message prompting the user to change orientation of the detection target be changed.

4. The monitoring system according to claim 3, wherein the recognition image is an image indicating a shape of the detection target.

5. The monitoring system according to claim 3, wherein the recognition image is an identification image that identifies the detection target.

6. A monitoring system for detecting an event happening to a detection target, comprising:
    an imaging device configured to capture an image of an imaging area including the detection target to generate captured image data indicating a captured image;
    first storage configured to store therein data indicating a detection range in the captured image; and
    a controller configured to detect a change to the captured image in the detection range based on the captured image data, wherein
    the detection range includes a detection target image exhibiting the detection target,
    the controller determines whether or not any portion of an outline of the detection range falls outside of the captured image, and
    in a situation in which a portion of the outline of the detection range falls outside of the captured image, the controller changes a position of the detection range so that an entirety of the outline of the detection range is located within the captured image.

7. The monitoring system according to claim 6, wherein the controller acquires a change in size of the detection target image and changes the detection range depending on the change in the size of the detection target image.

8. The monitoring system according to claim 6, further comprising:
    a notification device configured to notify a user of information; and
    second storage configured to store therein a recognition image of the detection target, wherein
    in a situation in which a percentage of match between the recognition image and the detection target image is lower than a threshold, the controller directs the notification device to notify the user of a message prompting the user to change orientation of the detection target be changed.

9. The monitoring system according to claim 8, wherein the recognition image is an image indicating a shape of the detection target.

10. The monitoring system according to claim 8, wherein the recognition image is an identification image that identifies the detection target.

* * * * *